(12) United States Patent
Ogino

(10) Patent No.: US 7,391,461 B2
(45) Date of Patent: Jun. 24, 2008

(54) APPARATUS, METHOD AND CONTROL COMPUTER PROGRAM FOR IMAGING A PLURALITY OF OBJECTS AT DIFFERENT DISTANCES

(75) Inventor: Hiroyuki Ogino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 697 days.

(21) Appl. No.: 10/372,972

(22) Filed: Feb. 26, 2003

(65) Prior Publication Data
US 2003/0169363 A1    Sep. 11, 2003

(30) Foreign Application Priority Data
Mar. 6, 2002    (JP) ............... 2002-060903

(51) Int. Cl.
*H04N 5/232* (2006.01)
*H04N 5/228* (2006.01)

(52) U.S. Cl. .................... 348/345; 348/208.12; 396/103
(58) Field of Classification Search ................. 348/345, 348/208.12
See application file for complete search history.

(56) References Cited

U.S. PATENT DOCUMENTS

| 5,633,976 | A | 5/1997 | Ogino ................... 386/120 |
|---|---|---|---|
| 5,739,857 | A * | 4/1998 | Kaneda .................... 348/349 |
| 6,124,891 | A * | 9/2000 | Homma et al. ............ 348/364 |
| 6,614,998 | B1 * | 9/2003 | Senba et al. .............. 396/123 |
| 6,930,712 | B1 * | 8/2005 | Higuchi et al. ........ 348/231.99 |
| 7,085,488 | B2 * | 8/2006 | Ogino ...................... 396/133 |
| 2002/0075395 | A1 * | 6/2002 | Ohkawara ................. 348/347 |
| 2003/0189645 | A1 * | 10/2003 | Kinjo ...................... 348/207.2 |
| 2005/0253934 | A1 * | 11/2005 | Yamagishi et al. ....... 348/222.1 |

FOREIGN PATENT DOCUMENTS

| JP | 2001-116979 | * | 4/2001 |
|---|---|---|---|
| JP | 2003-114378 |   | 4/2003 |

* cited by examiner

*Primary Examiner*—Nhan T Tran
*Assistant Examiner*—Hung H Lam
(74) *Attorney, Agent, or Firm*—Fitzpatrick, Cella, Harper & Scinto

(57) ABSTRACT

In an image pickup apparatus and method, and an image-pickup control computer program, a photographing optical system is driven, when a plurality of objects are present at different distances in a same detection field of view for identifying an object to be focused, so as to be focused on each of the plurality of objects, and a photographing operation is performed at each position of the photographing optical system driven so as to be focused on each of the plurality of objects.

16 Claims, 17 Drawing Sheets

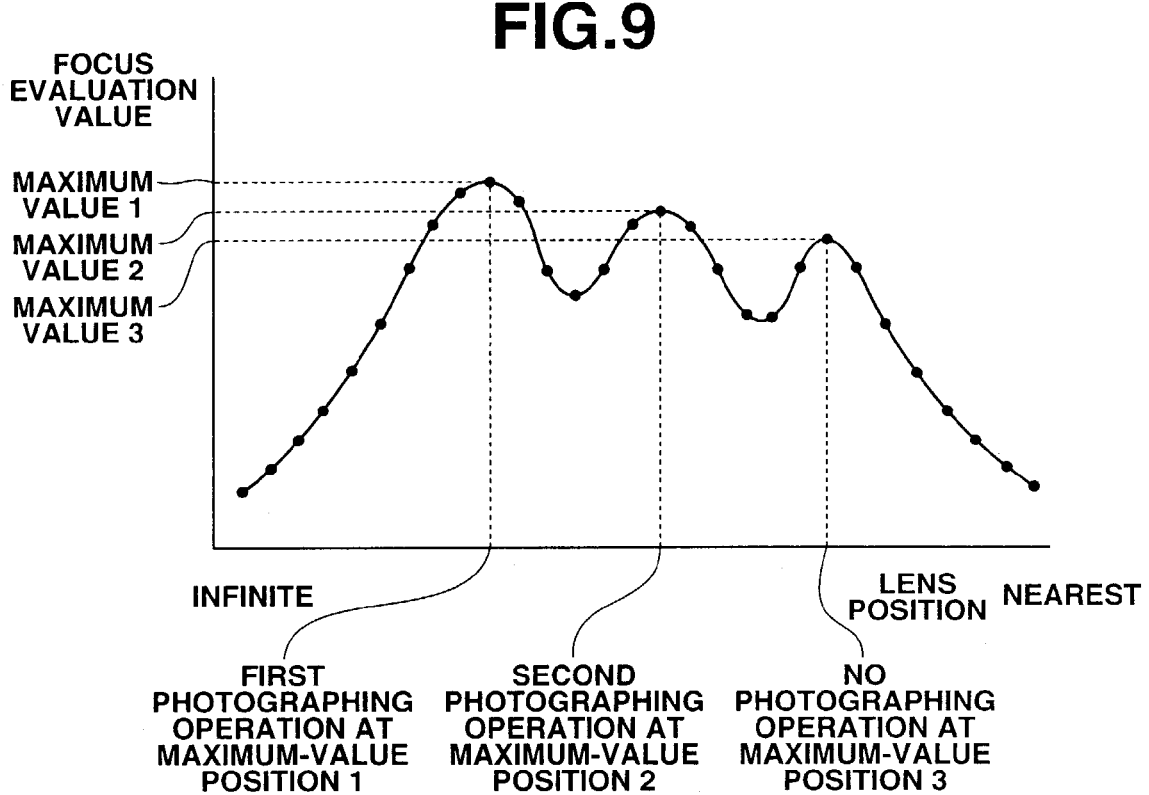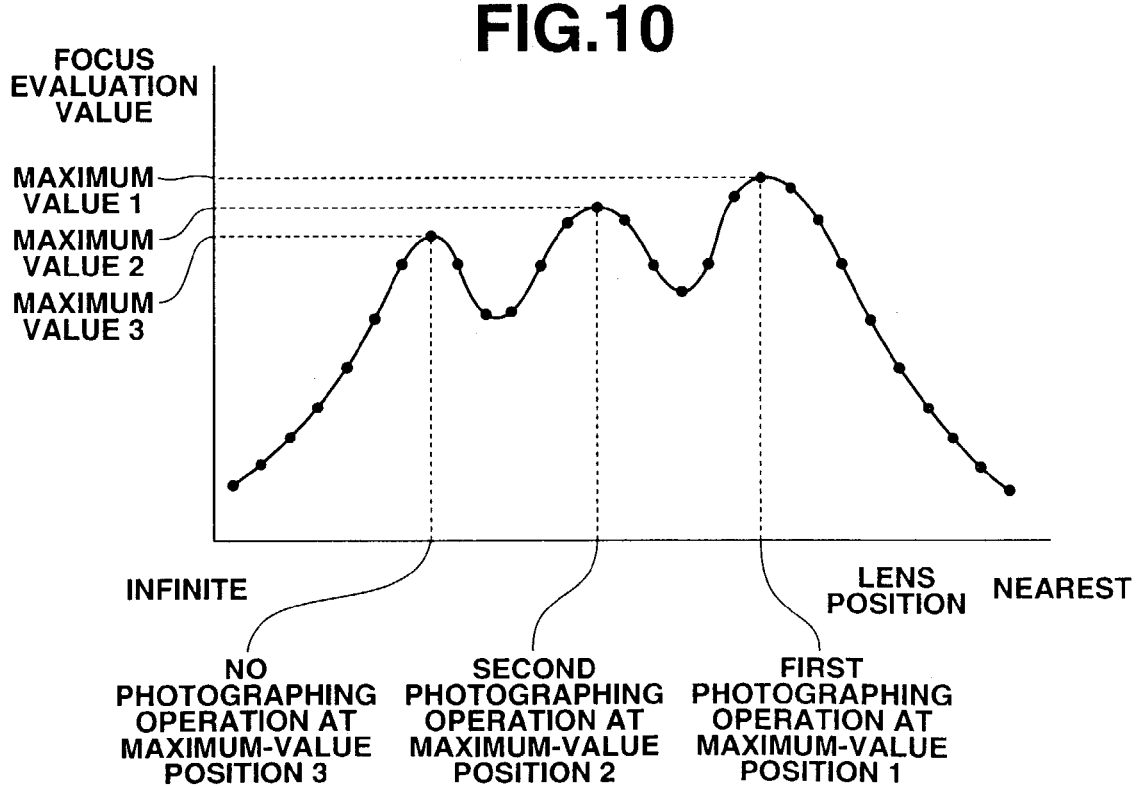

APPARATUS, METHOD AND CONTROL COMPUTER PROGRAM FOR IMAGING A PLURALITY OF OBJECTS AT DIFFERENT DISTANCES

BACKGROUND OF THE INVENTION

1. Field of the Invention

The present invention relates to an image pickup apparatus, such as an electronic still-image camera having a focus adjusting function, or the like, an image pickup method, and an image-pickup control computer program.

2. Description of the Related Art

Conventionally, in electronic still-image cameras, video cameras and the like, methods have been used in which a lens position where a high-frequency component of a luminance signal obtained from an image pickup device, such as a CCD (charge-coupled device) or the like, is maximized is made an in-focus position. Among such methods, a mountaineering method in which a lens is moved in a direction to increase a high-frequency component of a luminance signal (hereinafter termed a "focus evaluation value") obtained from an image pickup device, and a position where the focus evaluation value is maximized is made an in-focus position, and a scanning method in which focus evaluation values are stored by moving a lens over the entire range region, and a lens position corresponding to the maximum value of the stored values is made an in-focus position have been known.

Usually, in these methods, as shown in FIG. 15, a central portion of a photographing picture frame is used as a range frame, and a lens position having a maximum focus evaluation value for an object within the range frame is made an in-focus position. A method has been known in which, as shown in FIG. 16, a plurality of range frames are set, and after storing focus evaluation values for the respective range frames, a lens position corresponding to the maximum value of the focus evaluation values for each of the range frames is obtained, and a position where a lens is to be finally moved is determined from among these lens positions. The relationship between the lens position and the focus evaluation value obtained in the above-described manner has the shape of a mountain as shown in FIG. 17.

When objects at different distances are absent within the range frame as shown in FIG. 15 or FIG. 16, the relationship shown in FIG. 17 is obtained. However, when objects at different distances are present within the range frame, the relationship between the lens position and the focus evaluation value is as shown in FIG. 18. That is, a peak of focus evaluation values is present for each of the objects at the different distances. Accordingly, when objects at different distances are present within a range frame, peaks appear at two different lens positions, as shown in FIG. 18.

In such a case, since it is impossible for a camera to determine on which object the photographer intends to focus, the lens is in most cases moved by selecting a position corresponding to the closest distance from among a plurality of peak positions. In such an approach, however, for example, when photographing an image across a wire netting, the wire netting is focused instead of an object intended by the photographer to be focused. Even if the camera is not focused on the closest position, it is impossible for the camera to determine to be focused on a position intended by the photographer.

SUMMARY OF THE INVENTION

It is an object of the present invention to obtain an image in which a position intended by a photographer is focused even if at least two objects are present at different distances.

According to one aspect, the present invention relates to an image pickup apparatus including a focus adjusting unit for driving, when a plurality of objects are present at different distances in a same detection field of view for identifying an object to be focused, a photographing optical system so as to be focused on each of the plurality of objects, and a photographing unit for performing a photographing operation at each position of the photographing optical system driven by the focus adjusting unit so as to be focused on each of the plurality of objects.

According to another aspect, the present invention relates to an image pickup method including the steps of driving, when a plurality of objects are present at different distances in a same detection field of view for identifying an object to be focused, a photographing optical system so as to be focused on each of the plurality of objects, and performing a photographing operation at each position of the photographing optical system driven so as to be focused on each of the plurality of objects.

According to still another aspect, the present invention relates to an image-pickup control computer program representing a method including the steps of driving, when a plurality of objects are present at different distances in a same detection field of view for identifying an object to be focused, a photographing optical system so as to be focused on each of the plurality of objects, and performing a photographing operation at each position of the photographing optical system driven so as to be focused on each the plurality of objects.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 9 is a graph illustrating focus evaluation values at respective photographing positions acquired in the case of far-side preference in the flowchart shown in FIG. 8B;

FIG. 10 is a graph illustrating focus evaluation values at respective photographing positions acquired in the case of near-side preference in the flowchart shown in FIG. 8B;

DETAILED DESCRIPTION OF THE PREFERRED EMBODIMENTS

Preferred embodiments of the present invention will now be described in detail with reference to the drawings.

First Embodiment

Figure 1:
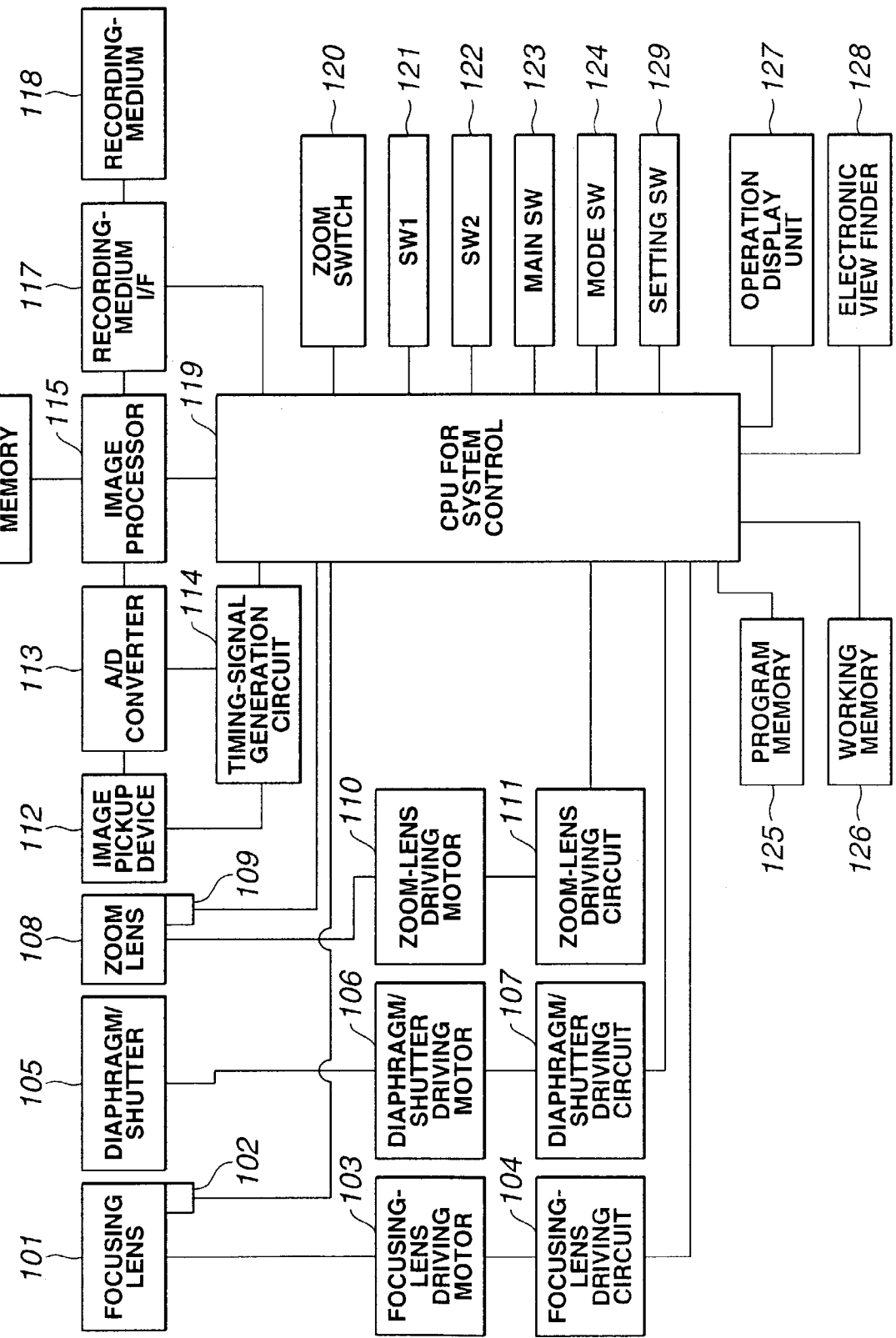
FIG. 1 is a block diagram illustrating the configuration of an electronic camera according to a first embodiment of the present invention.

FIG. 1 is a block diagram illustrating the configuration of an electronic camera according to a first embodiment of the present invention.

In FIG. 1, there are shown a focusing lens 101 for focusing the camera onto an image pickup device (to be described later), a photo-interrupter 102 for detecting the initial position of the focusing lens 101, a motor 103 for driving the focusing lens 101, a focusing-lens driving circuit 104 for moving the focusing lens 101 by inputting a driving signal to the motor 103, a light-amount control member 105 comprising a diaphragm, a shutter and the like, a motor 106 for driving the diagram/shutter 105, a diagram/shutter driving circuit 107 for driving the diagram/shutter 105 by inputting a driving signal to the motor 106, a zoom lens 108 for changing the focal distance of a photographing lens, a photo-interrupter 109 for detecting the initial position of the zoom lens 108, a motor 110 for driving the zoom lens 108, and a zoom-lens driving circuit 111 for moving the zoom lens 108 by inputting a driving signal to the motor 110.

An image pickup device 112 converts reflected light from an object into an electric signal. An A/D (analog-to-digital) converter 113 converts an analog signal output from the image pickup device 112 into a digital signal. A timing-signal generation circuit (hereinafter abbreviated as a "TG") 114 generates a timing signal necessary for operating the image pickup device 112 and the A/D converter 113. An image processor 115 performs predetermined processing for image data input from the A/D converter 113. A buffer memory 116 temporarily stores image data processed by the image processor 115. An interface 117 is for connection to a storage medium 118. The storage medium 118 comprises a memory card, a hard disk or the like. A micro-controller (hereinafter termed a CPU (central processing unit)) 119 controls a photographing sequence and the like of the entire system.

A zoom switch (SW) 120 is for inputting a signal instructing start or stop of a zooming operation to the CPU 119. A switch 121 (hereinafter termed a SW1) is for instructing preparation for a photographing operation, such as AF (autofocusing), AE (automatic exposure) or the like. A photographing-processing instruction switch 122 (hereinafter termed a SW2) is for instructing photographing processing, such as actual exposure, a recording operation or the like, after operating the SW1 121. A main switch 123 is for supplying the system with electric power. A mode switch 124 is for setting an operation mode of the camera. A program memory 115 stores programs to be executed by the CPU 119. A working memory 126 is for writing and reading various data necessary for performing processing in accordance with a program stored in the program memory 125, by the CPU 119. An operation display unit 127 displays an operation state of the camera and each type of warning. An electronic viewfinder (hereinafter abbreviates as an "EVF") 128 displays an image. A setting switch 129 performs various settings.

Next, the operations of the electronic camera of the first embodiment will be described with reference to the flowchart shown in FIG. 2.

First, in step S201, it is determined whether or not the SW1 for instructing preparation for a photographing operation is switched on. If the result of the determination in step S201 is affirmative, the process proceeds to step S205. If the result of the determination in step S201 is negative, the process proceeds to step S202. In step S202, an AE operation is performed so that the luminance of the image displayed in the EVF 128 is appropriate by adjusting the diaphragm 105 or the shutter speed. In step S203, an automatic white balance (AWB) operation is performed so that the image displayed in the EVF 128 has an appropriate color balance irrespective of the color temperature of the light source. In step S204, predetermined processing is performed for an image signal read from the image pickup device 112, and the resultant image is displayed in the EVF 128. In step S205, photographing processing is performed in accordance with a procedure (to be described later).

Figure 2:
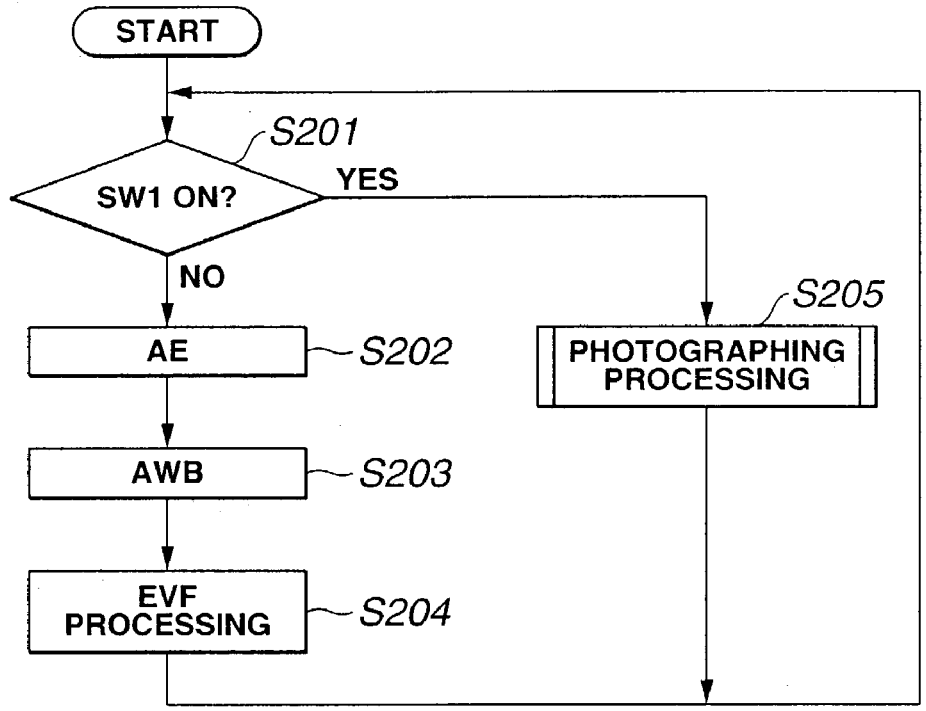
FIG. 2 is a flowchart illustrating the basic operation of the electronic camera shown in FIG. 1.
Figure 3:
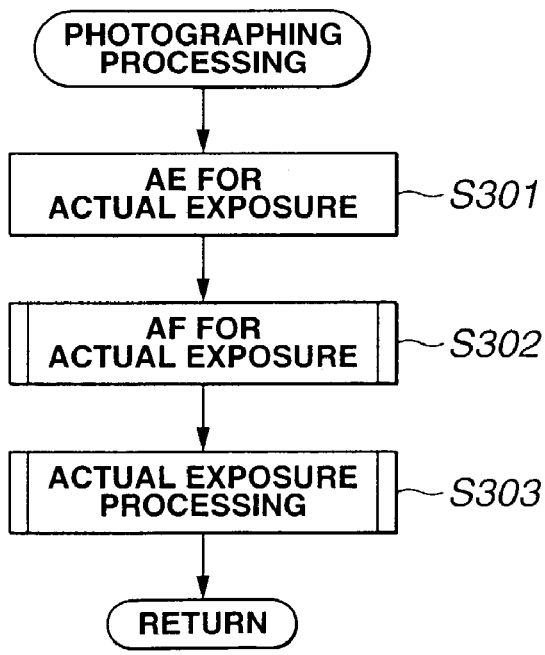
FIG. 3 is a flowchart illustrating photographing processing shown in FIG. 2.

FIG. 3 is a flowchart illustrating the photographing processing in step S205 shown in FIG. 2.

In step S301, an AE operation for actual exposure is performed. In step S302, an AF operation for actual exposure is performed in accordance with a procedure (to be described later). In step S303, actual exposure and recording are performed in accordance with a procedure (to be described later).

Figure 4:
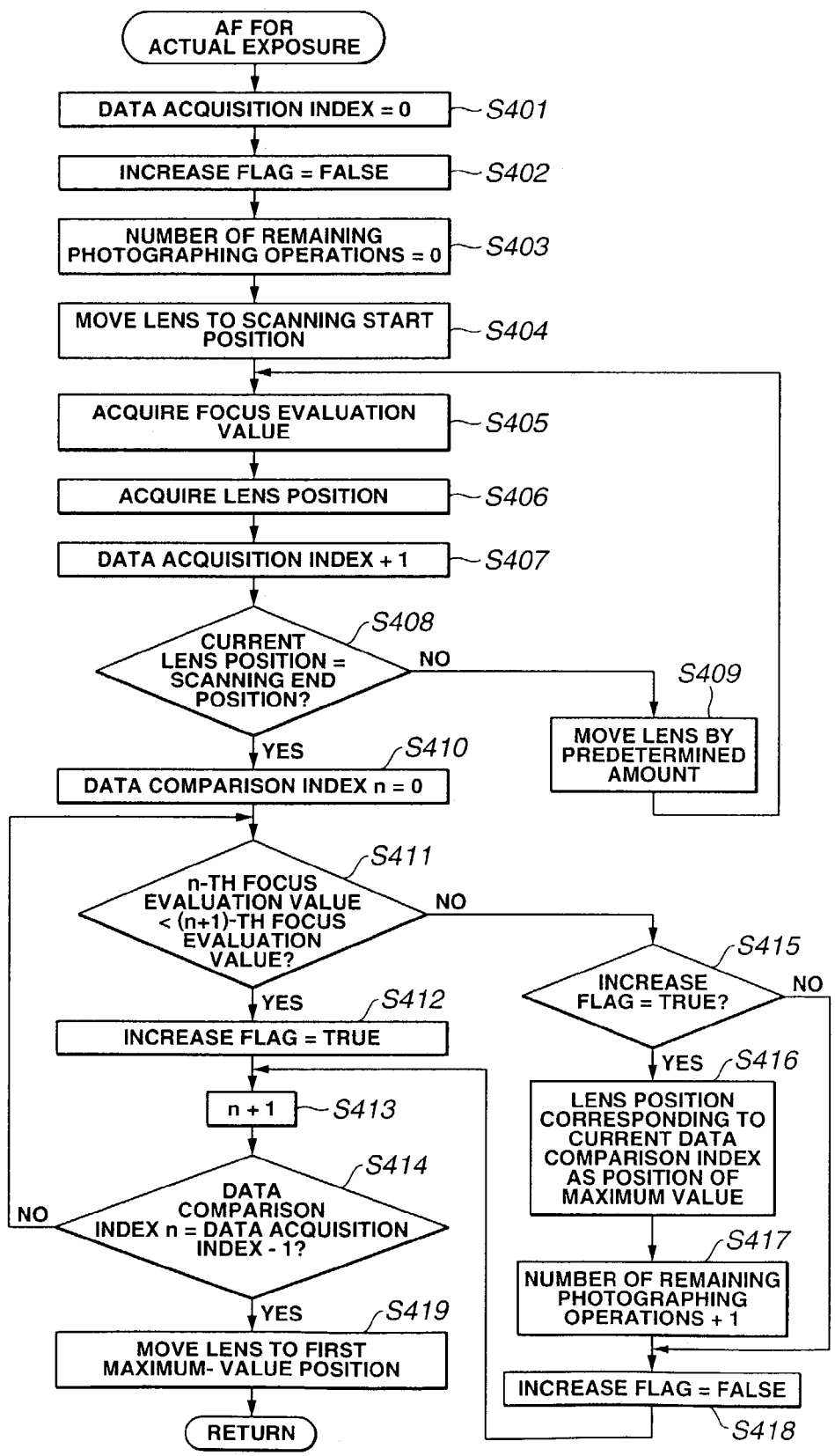
FIG. 4 is a flowchart illustrating AF processing for actual exposure shown in FIG. 3.

FIG. 4 is a flowchart illustrating the AF operation for actual exposure in step S302 shown in FIG. 3.

First, in step S401, a data acquisition index is set to 0 and is stored in the working memory 126. The data acquisition index is used for acquiring, when storing focus evaluation values (to be described later) and the positions of the focusing lens 101 in the working memory 126, these values, and for indicating the order of storage and the total number of acquired and stored data.

In step S402, an increase flag is set to FALSE and is stored in the working memory 126. The increase flag indicates whether or not the acquired focus evaluation value increases with respect to the immediately preceding focus evaluation value that has been stored.

In step S403, the number of remaining photographing operations in actual exposure processing (to be described later) is set to 0 and is stored in the working memory 126. The number of remaining photographing operations indicates the number of photographing operations in actual exposure processing (to be described later).

In step S404, the focusing lens 101 is moved to a scanning start position. The scanning start position is, for example, an infinite end of a focusable region.

In step S405, an analog image signal read from the image pickup device 112 is converted into a digital signal using the A/D converter 113. A high-frequency component of a luminance signal of the output of the A/D converter 113 is extracted by the image processor 115, and is stored in the working memory 126 as a focus evaluation value.

In step S406, the current position of the focusing lens 101 is acquired and is stored in the working memory 126. When a stepping motor is used as the focusing-lens driving motor 103, the number of relative driving pulses from the initial position detected by the photo-interrupter 102 is used as the position of the focusing lens 101. The absolute position may also be measured using a rotary encoder (not shown) or the like.

In step S407, the data acquisition index is incremented by one, and the resultant value is stored in the working memory 126.

In step S408, it is determined whether or not the current position of the focusing lens 101 equals a scanning end position. If the result of the determination in step S408 is affirmative, the process proceeds to step S410. If the result of the determination in step S408 is negative, the process proceeds to step S409. The scanning end position is, for example, the nearest end of the focusable region.

In step S409, the focusing lens 101 is moved in the scanning end direction by a predetermined amount.

In step S410, a data comparison index n is set to 0 and is stored in the working memory 126. The data comparison index n is used for indicating, when comparing focus evaluation values acquired in step S405 and stored in the working memory 126, the order of the acquired focus evaluation values.

In step S411, it is determined whether or not the (n+1)-th focus evaluation value is larger than the n-th focus evaluation value. That is, a certain focus evaluation value is compared with the immediately succeeding focus evaluation value that has been acquired. If the result of the determination in step S411 is affirmative, the process proceeds to step S412. If the result of the determination in step S411 is negative, the process proceeds to step S415.

In step S412, the increase flag is set to TRUE. In step S413, the data comparison index n is incremented by one. In step S414, it is determined whether or not the data comparison index n equals the data acquisition index −1. If the result of the determination in step S414 is affirmative, the process proceeds to step S419. If the result of the determination in step S414 is negative, the process returns to step S411.

In step S415, it is determined whether or not the increase flag is set to TRUE. If the result of the determination in step S415 is affirmative, the process proceeds to step S416. If the result of the determination in step S415 is negative, the process proceeds to step S418.

In step S416, a lens position corresponding to the current data comparison index n is stored as the position of a maximum value. That is, the position of the focusing lens 101 stored in the working memory 126 at the n-th time is stored in the working memory 126 as the position of a maximum value. In step S417, the number of remaining photographing operations is incremented by one. In step S418, the increase flag is set to FALSE, and the process proceeds to step S413.

In step S419, the focusing lens 101 is moved to a first position where the focus evaluation value has a maximum value. The first position is a position closest to the infinite end from among the positions of the focusing lens 101 stored in step S416.

Figure 5:
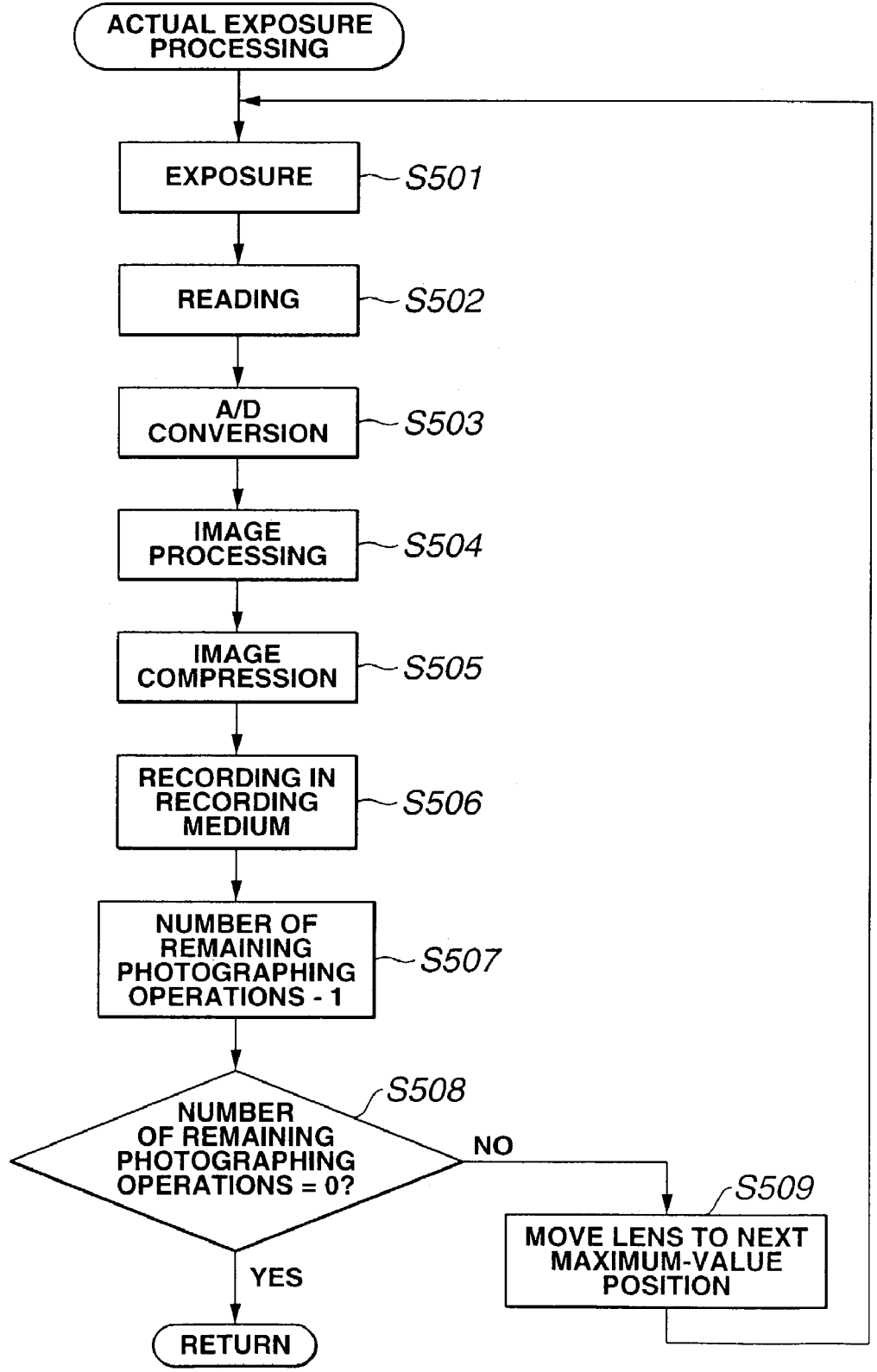
FIG. 5 is a flowchart illustrating actual exposure processing shown in FIG. 3.

FIG. 5 is a flowchart illustrating actual exposure processing in step S303 shown in FIG. 3.

First, in step S501, exposure on the image pickup device 112 is performed. In step S502, data stored in the image pickup device 112 is read. In step S503, an analog signal read from the image pickup device 112 is converted into a digital signal using the A/D converter 113. In step S504, various sets of image processing are performed for the digital signal output from the A/D converter 113 using the image processor 115. In step S505, the image processed in step S504 is compressed in accordance with a JPEG (Joint Photographic Experts Group) format or the like. In step S506, the data compressed in step S505 is recorded in the recording medium 118, such as a memory card or the like, mounted in the main body of the electronic camera, via the recording-medium interface 117.

In step S507, the number of remaining photographing operations that has been described with reference to the flowchart shown in FIG. 4 is decremented by one. In step S508, it is determined whether or not the number of remaining photographing operations is 0. If the result of the determination in step S508 is affirmative, the process is terminated. If the result of the determination in step S508 is negative, the process proceeds to step S509. In step S509, the focusing lens 101 is moved to the next maximum-value position, and the process returns to step S501. This maximum-value position is the position of the focusing lens 101 where the focus evaluation value has a maximum value that has been stored in the working memory 126 in step S416 shown in FIG. 4.

In the processing described with reference to FIGS. 4 and 5, as described from step S404 to step S409, focus evaluation values are sequentially acquired by moving the focusing lens 101 from the infinite end to the nearest end of the focusable region by a predetermined amount. Then, as described from step S411 to step S418, a focus evaluation value acquired at a certain time is compared with a focus evaluation value acquired at the next time. This operation is sequentially performed. When a focus evaluation value acquired at the next time turns to be smaller than a focus evaluation value acquired at a certain time, it is considered that the focus evaluation value at that position has a maximum value, and the position of the focusing lens 101 at that time is stored. The position of the focusing lens 101 where the focus evaluation value has a maximum value is stored in the working memory 126, and the number of such positions is stored in the working memory 1126 as the number of remaining photographing operations.

Figure 6:
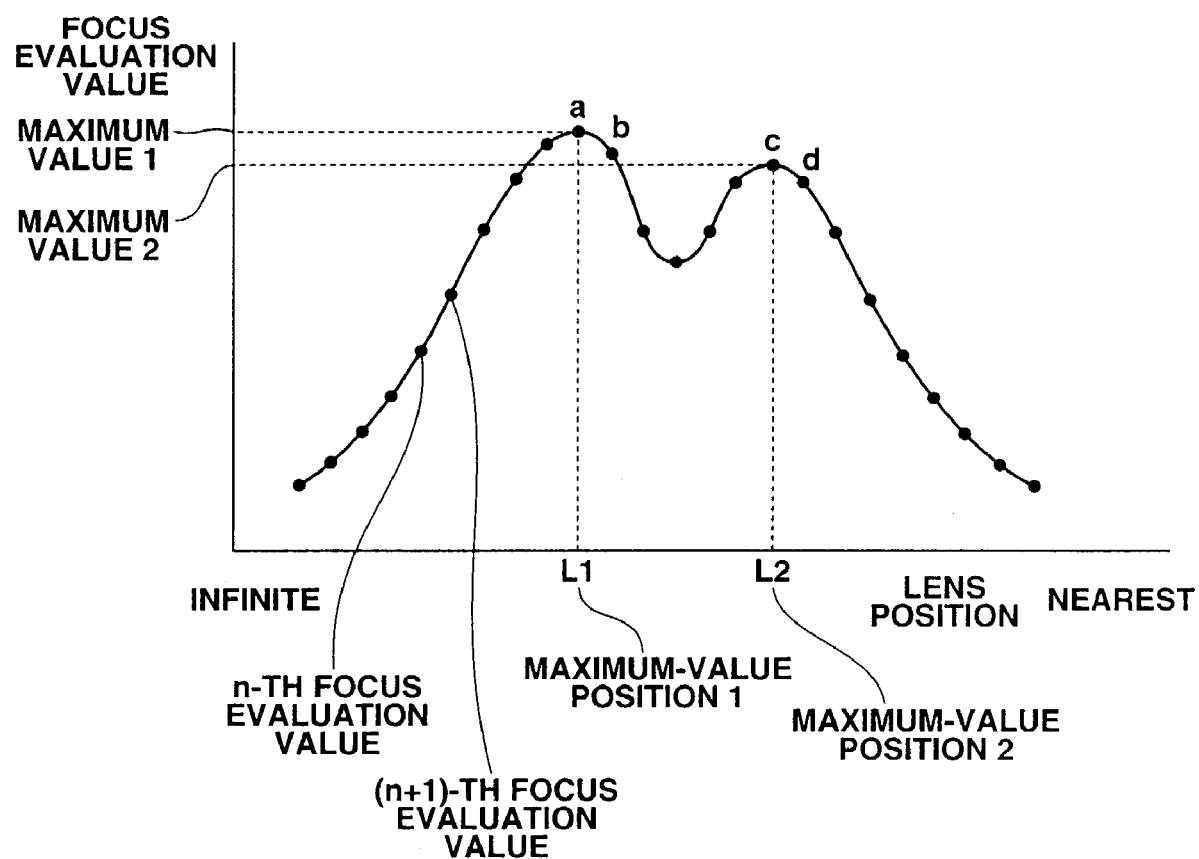
FIG. 6 is a graph illustrating focus evaluation values acquired according to the flowchart shown in FIG. 4.

When the relationship between the positions of the focusing lens 101 and the acquired focus evaluation values is as shown in FIG. 6, two maximum-value positions are extracted according to the above-described processing. That is, as a result of comparison between the n-th focus evaluation value and the (n+1)-th focus evaluation value, since the difference changes from increase to decrease at positions between values "a" and b, and c and d, the values "a" and c are maximum values. If the positions of the focusing lens 101 that has acquired these focus evaluation values are represented by L1 and L2, these are the positions for the maximum values. These positions are termed maximum-value position 1 and maximum-value position 2.

Then, actual exposure processing is performed by first moving the focusing lens 101 to the maximum-value position 1, i.e., L1. Then, actual exposure processing is performed by moving the focusing lens 101 to the maximum-value position 2, i.e., L2.

When the curve of focus evaluation values as shown in FIG. 6 is obtained, it is considered that objects positioned at two different distances are present within the range frame. In such a case, it is impossible for the camera to determine on which of the far and near objects the photographer intends to focus the camera. Accordingly, by sequentially performing photographing operations at positions at each of which the focus evaluation value has a maximum value, one of two photographed images is an image intended by the photographer to be photographed. The photographer may select a desired image from among the two obtained images.

The case in which two maximum values are present has been illustrated in the description with reference to FIG. 6, the situation is the same even if the number of maximum values increases.

As described above, even if at least one object at a far distance and at least one object at a near distance are present within a range frame, an image in which an object intended by the photographer to be photographed is assuredly focused can be obtained.

Second Embodiment

Although in the foregoing description, photographing operations are performed at respective positions of the focusing lens 101 at each of which the focus evaluation value has a maximum value, the number of photographing operations increases if the number of maximum values is large. Processing in such a case will now be described.

Figure 7:
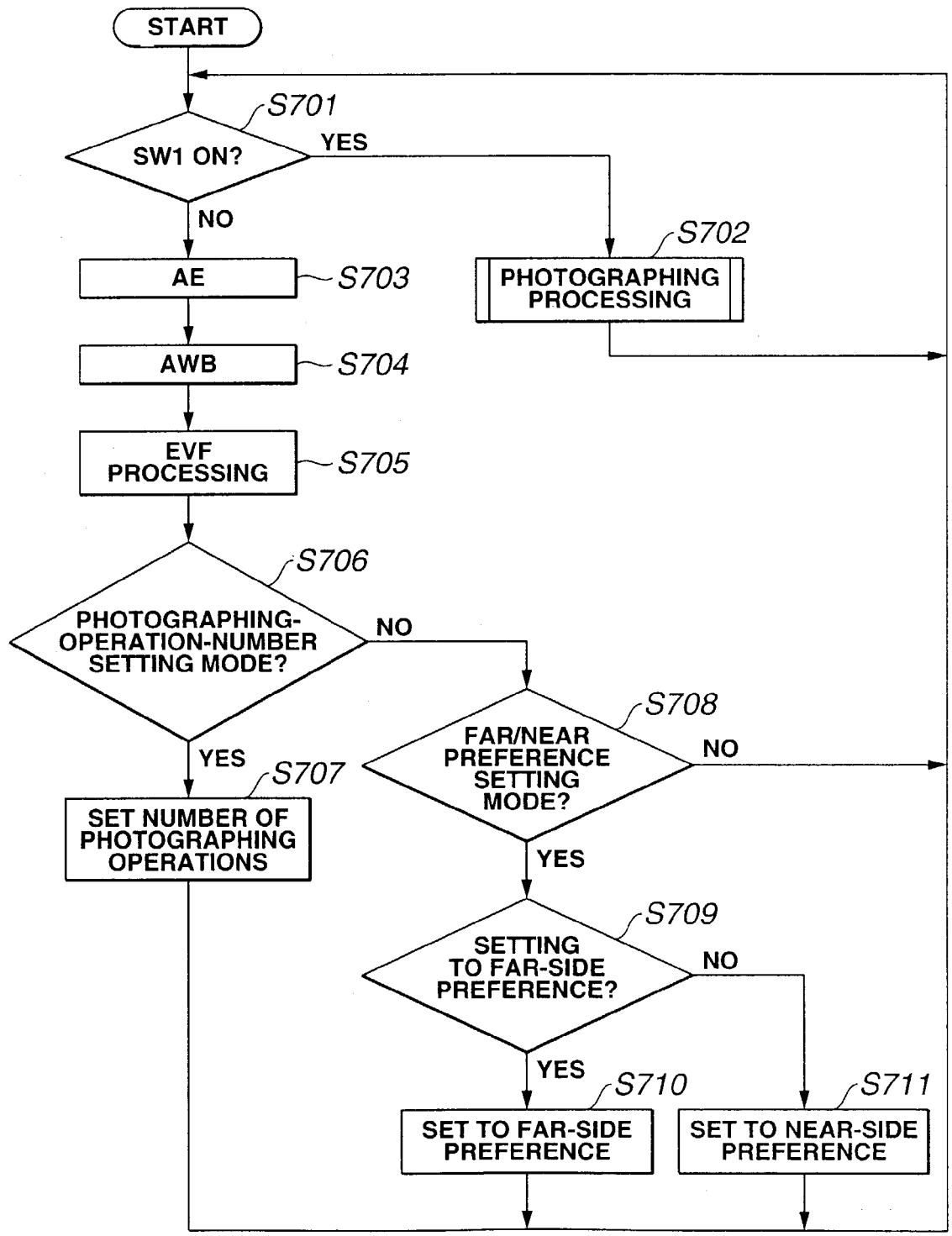
FIG. 7 is a flowchart illustrating the basic operation of an electronic camera according to a second embodiment of the present invention.

FIG. 7 is a replaced flowchart of FIG. 2 described in the first embodiment.

First, in step S701, it is determined whether or not the SW1 for instructing preparation for a photographing operation is switched on. If the result of the determination in step S701 is affirmative, the process proceeds to step S702. If the result of the determination in step S701 is negative, the process proceeds to step S703. In step S703, an AE operation is performed so that the luminance of the image displayed in the EVF 128 is appropriate by adjusting the diaphragm 105 or the shutter speed. In step S704, an automatic white balance (AWB) operation is performed so that the image displayed in the EVF 128 has an appropriate color balance irrespective of the color temperature of the light source. In step S705, predetermined processing is performed for an image signal read from the image pickup device 112, and the resultant image is displayed in the EVF 128.

In step S706, it is determined whether or not the mode switch 124 sets a photographing-operation-number setting mode. If the result of the determination in step S706 is affirmative, the process proceeds to step S707. If the result of the determination in step S706 is negative, the process proceeds to step S708. In step S707, the number of photographing operations is set by operating the setting switch 129.

In step S708, it is determined whether or not the mode switch 124 sets a far/near preference setting mode. If the result of the determination in step S708 is affirmative, the process proceeds to step S709. If the result of the determination in step S708 is negative, the process returns to step S701. In step S709, it is determined whether or not the setting switch 129 sets far-side preference. If the result of the determination in step S709 is affirmative, the process proceeds to step S710. If the result of the determination in step S709 is negative, the process proceeds to step S711. In step S710, the photographing mode is set to far-side preference. In step S710, the photographing mode is set to near-side preference.

The photographing processing in step S702 is the same as the processing described in the first embodiment with reference to FIG. 3.

Figure 8A:
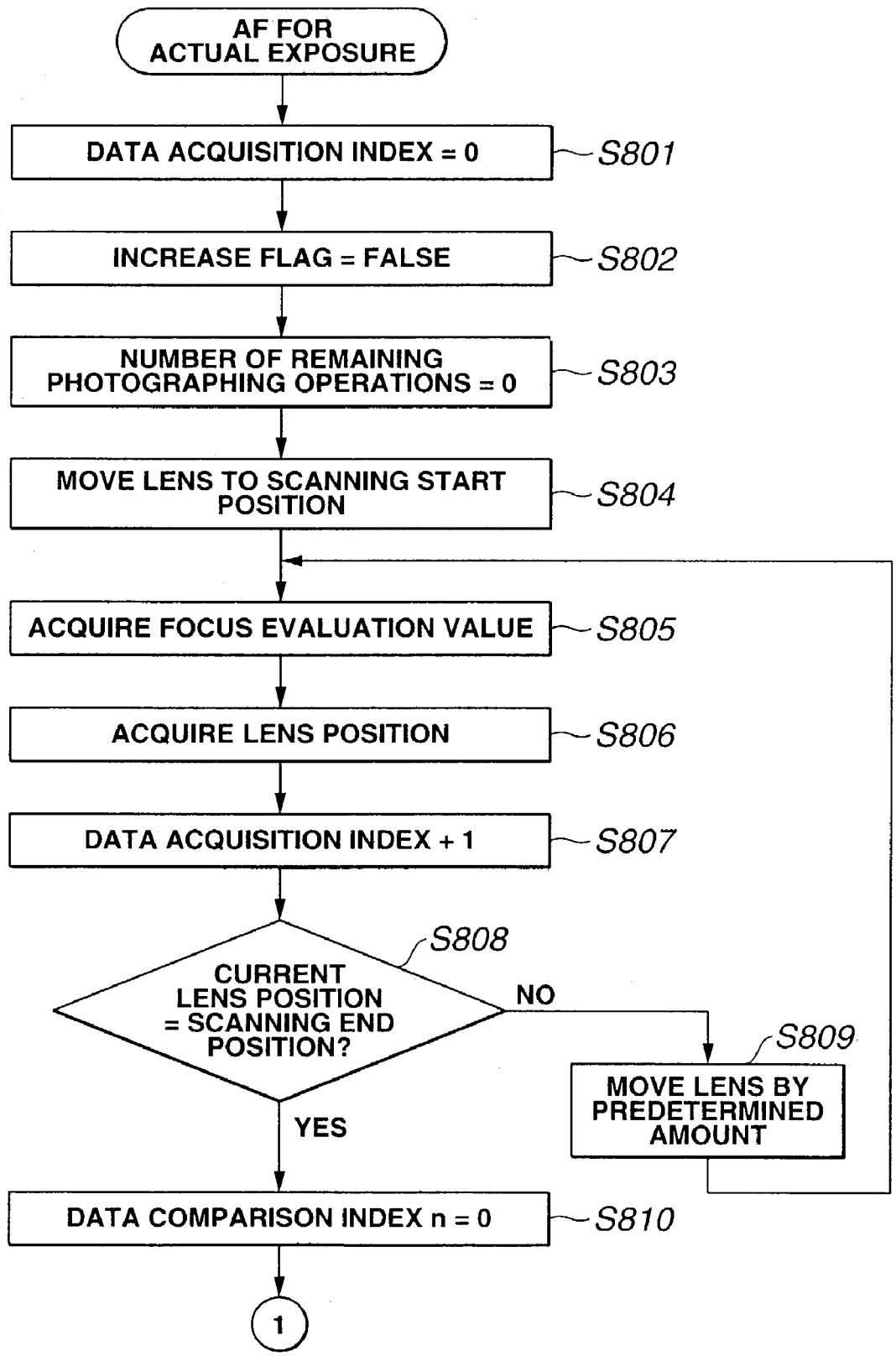
FIGS. 8A and 8B are flowcharts illustrating AF processing for actual exposure shown in FIG. 3, according to the second embodiment.
Figure 8B:
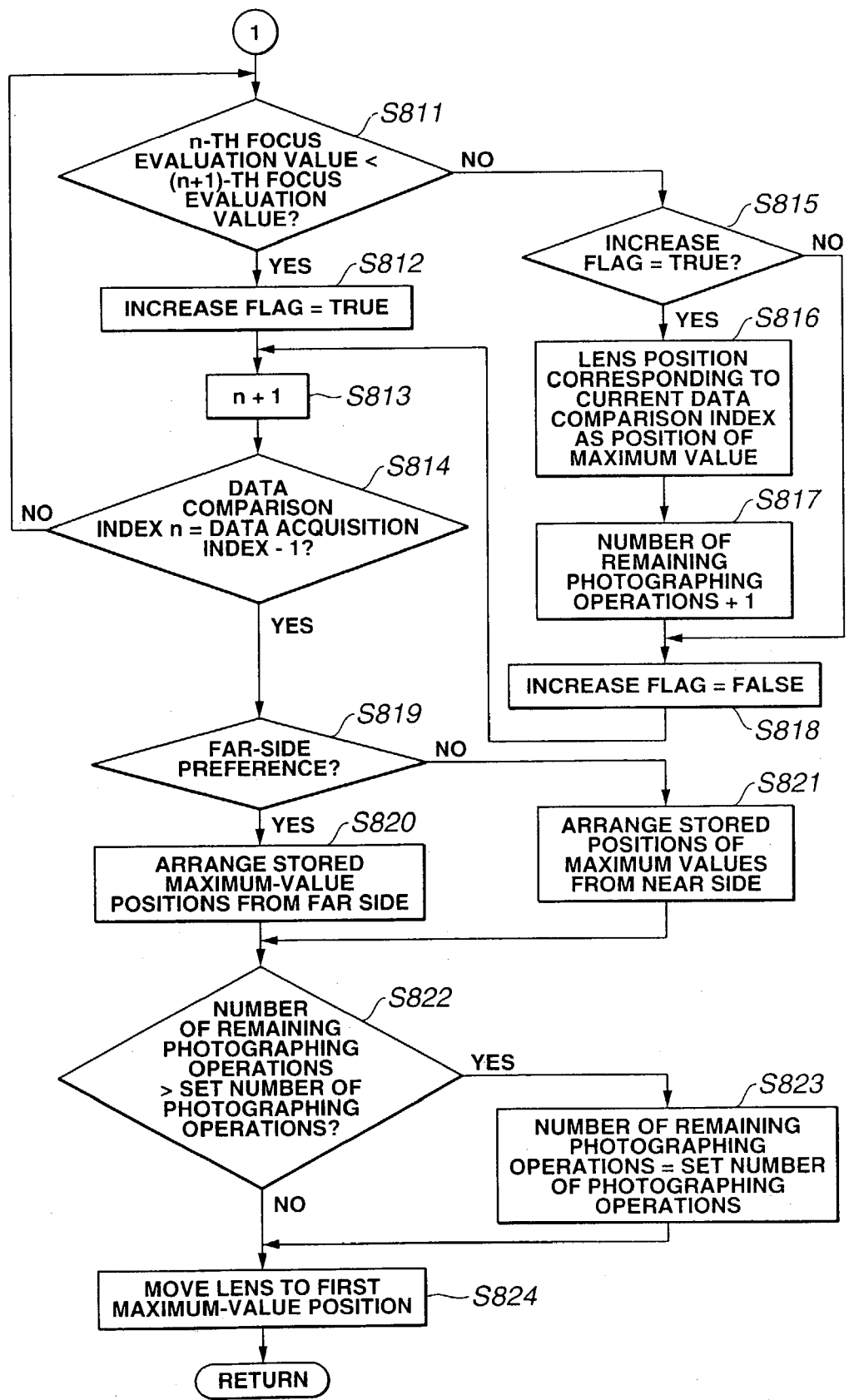

FIGS. 8A and 8B are replaced flowcharts of FIG. 4 describing the AF processing for actual exposure in step S302 shown in FIG. 3.

First, in step S801, a data acquisition index is set to 0 and is stored in the working memory 126. The data acquisition index is the same as that used in FIG. 4 in the first embodiment.

In step S802, an increase flag is set to FALSE and is stored in the working memory 126. The increase flag is the same as that used in FIG. 4 in the first embodiment.

In step S803, the number of remaining photographing operations in actual exposure processing (the same as that used in FIG. 4 in the first embodiment) is set to 0 and is stored in the working memory 126.

In step S804, the focusing lens 101 is moved to a scanning start position. The scanning start position is, for example, an infinite end of a focusable region.

In step S805, an analog image signal read from the image pickup device 112 is converted into a digital signal using the A/D converter 113. A high-frequency component of a luminance signal of the output of the A/D converter 113 is extracted by the image processor 115, and is stored in the working memory 126 as a focus evaluation value.

In step S806, the current position of the focusing lens 101 is acquired and is stored in the working memory 126. In step S807, the data acquisition index is incremented by one, and the resultant value is stored in the working memory 126. In step S808, it is determined whether or not the current position of the focusing lens 101 equals a scanning end position. If the result of the determination in step S808 is affirmative, the process proceeds to step S810. If the result of the determination in step S808 is negative, the process proceeds to step S809. The scanning end position is, for example, the nearest end of the focusable region. In step S809, the focusing lens 101 is moved in the scanning end direction by a predetermined amount.

In step S810, a data comparison index n is set to 0 and is stored in the working memory 126. The data comparison index n is the same as that used in FIG. 4 in the first embodiment.

In step S811, it is determined whether or not the (n+1)-th focus evaluation value is larger than the n-th focus evaluation value. That is, a certain focus evaluation value is compared with the immediately succeeding focus evaluation value that has been acquired. If the result of the determination in step S811 is affirmative, the process proceeds to step S812. If the result of the determination in step S811 is negative, the process proceeds to step S815.

In step S812, the increase flag is set to TRUE. In step S813, the data comparison index n is incremented by one. In step S814, it is determined whether or not the data comparison index n equals the data acquisition index −1. If the result of the determination in step S814 is affirmative, the process proceeds to step S819. If the result of the determination in step S814 is negative, the process returns to step S811.

In step S815, it is determined whether or not the increase flag is set to TRUE. If the result of the determination in step S815 is affirmative, the process proceeds to step S816. If the result of the determination in step S815 is negative, the process proceeds to step S818.

In step S816, a lens position corresponding to the current data comparison index n is stored as the position of a maximum value. That is, the position of the focusing lens 101 stored in the working memory 126 at the n-th time is stored in the working memory 126 as the position of a maximum value. In step S817, the number of remaining photographing operations is incremented by one. In step S818, the increase flag is set to FALSE, and the process proceeds to step S813.

In step S819, it is determined whether or not the current photographing mode is set to far-side preference. If the result of the determination in step S819 is affirmative, the process proceeds to step S820. If the result of the determination in step S819 is negative, the process proceeds to step S821. The current photographing mode is the mode set in step S710 or 711 shown in FIG. 7.

In step S820, the maximum-value positions stored in the working memory 126 in step S816 are arranged from a far side. That is, a position closest to infinite from among the maximum-value positions becomes the first position. In step S821, the maximum-value positions stored in the working memory 126 in step S816 are arranged from a near side. That is, a position closest to the nearest position from among the maximum-value positions becomes the first position.

In step S822, it is determined whether or not the number of remaining photographing operations set in step S817 is larger than the number of photographing operations set in step S707 shown in FIG. 7. If the result of the determination in step S822 is affirmative, the process proceeds to step S823. If the result of the determination in step S822 is negative, the process proceeds to step S824.

In step S823, the number of photographing operations set in step S707 shown in FIG. 7 is newly set as the number of remaining photographing operations. In step S824, the focusing lens 101 is moved to the first position of the maximum-value positions arranged in step S820 or S821.

In the processing described with reference to FIGS. 7, 8A and 8B, the following operations are performed. As an example, a description will be provided of a case in which the number of photographing operations is set to 2 in step S707 shown in FIG. 7, and the photographing mode is set to far-side preference in step S710.

First, AF processing for actual exposure is performed in accordance with the flowcharts shown in FIGS. 8A and 8B. When three maximum values are obtained in this processing, as shown in FIG. 9, three maximum-value positions are sequentially arranged from the far side, i.e., a side closer to infinite, in step S820 shown in FIG. 8B. Actual exposure processing is performed in the same manner as the processing shown in FIG. 5 in the first embodiment. The order of photographing operations at that time is the order of arrangement in step S820.

Since the three maximum values are present, the number of remaining photographing operations is set to 3 in step S817 shown in FIG. 8B. On the other hand, the number of photographing operations set in step S707 shown in FIG. 7 is 2. Since the number of remaining photographing operations of 3 is larger as a result of comparison in step S822 shown in FIG. 8B, the number of photographing operations of 2 set in step S707 shown in FIG. 7 is newly set as the number of remaining photographing operations.

Then, in step S824 shown in FIG. 8B, the focusing lens 101 is moved to a first maximum-value position. The first maximum-value position at that time is a position closest to infinite from among the maximum-value positions arranged in step S820 shown in FIG. 8B. Maximum-value position 1 shown in FIG. 9 is that position. A first photographing operation is performed at this position. Then, a photographing operation is performed by moving the focusing lens 101 to maximum-value position 2 shown in FIG. 9. In step S507 shown in FIG. 5 in the first embodiment, the number of remaining photographing operations is decremented by one every time a photographing operation is performed. Hence, the number of photographing operations becomes 0 at that time. That is, the succeeding photographing operation is not performed, and therefore a photographing operation is not performed at maximum-value position 3 shown in FIG. 9.

When the photographing mode is set to near-side preference in step S711 shown in FIG. 7, and other conditions are the same as those in the foregoing description, the first maximum-value position is a position closest to the nearest position, i.e., maximum-value position 1 shown in FIG. 10. A first photographing operation is performed at this position, and a second photographing operation is performed at maximum-value position 2 shown in FIG. 10. Since the number of photographing operations is 2, a photographing operation is not performed at maximum-value position 3 shown in FIG. 10.

When the number of maximum values is smaller than the number of photographing operations set in step S707 shown in FIG. 7, photographing operations equal to the number of maximum values are performed.

As described above, when a plurality of maximum values of focus evaluation values representing best focused positions are present, by setting the number of photographing operations in advance, it is prevented to unnecessarily perform a large number of photographing operations. Furthermore, by giving priority to the far side or the near side at that time, it is possible to easily obtain an image in which the camera is focused on an object intended by the photographer to be photographed.

Third Embodiment

Figure 16:
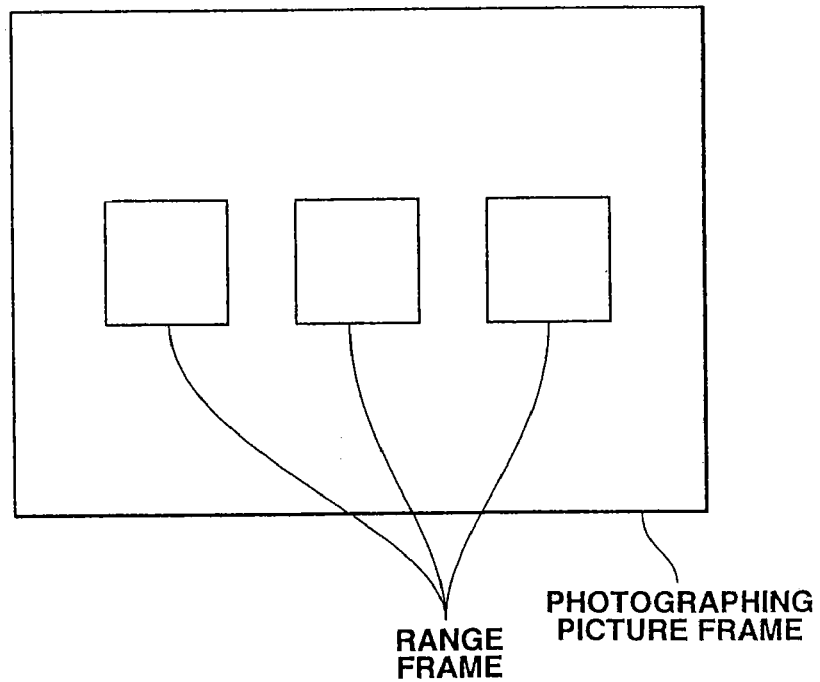
FIG. 16 is a diagram illustrating a plurality of range frames in a photographing picture frame.
Figure 17:
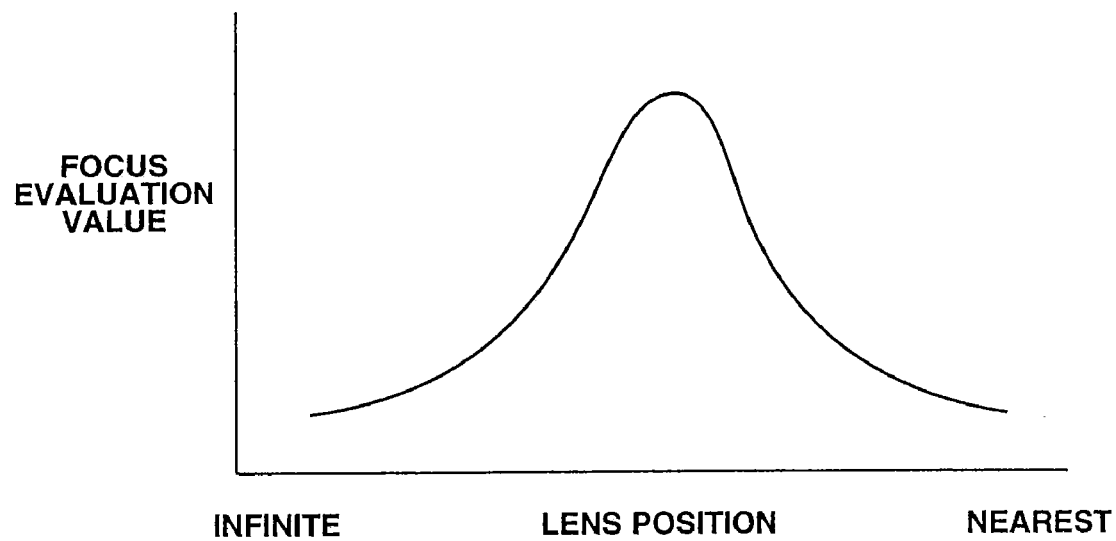
FIG. 17 is a graph illustrating focus evaluation values with respect to respective focusing-lens positions.
Figure 18:
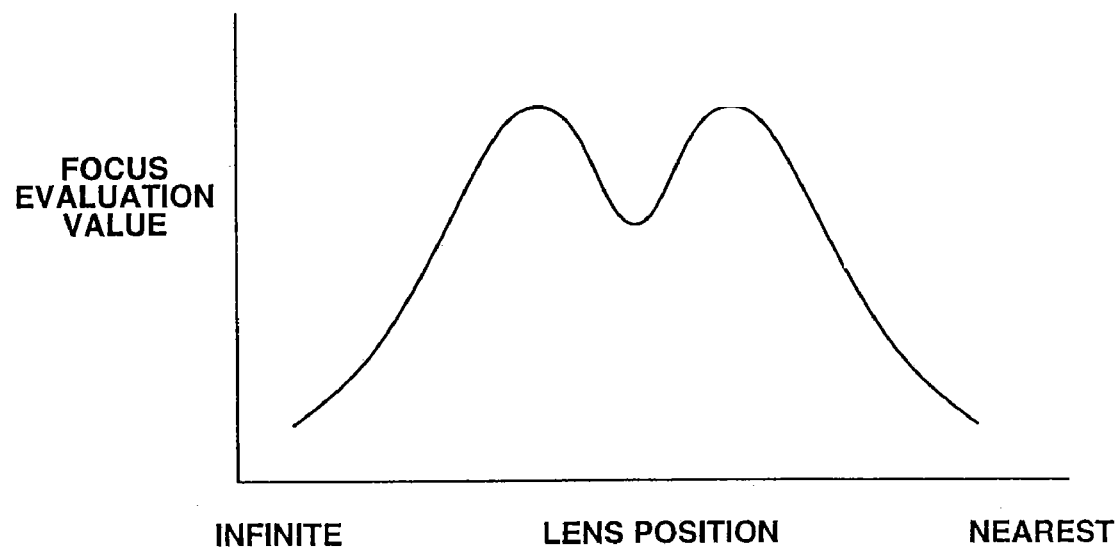
FIG. 18 is a graph illustrating a case in which a plurality of maximum values are present in focus evaluation values with respect to focusing-lens positions.

When a plurality of range frames are present, it is considered that the maximum values of focus evaluation values are produced for each of the range frames as described above. In such a case, photographing operations are performed at maximum-value positions for each of the range frames. Such processing will now be described. In the following description, a case in which three range frames are provided in the horizontal direction as shown in FIG. 16 will be illustrated.

Figure 11A:
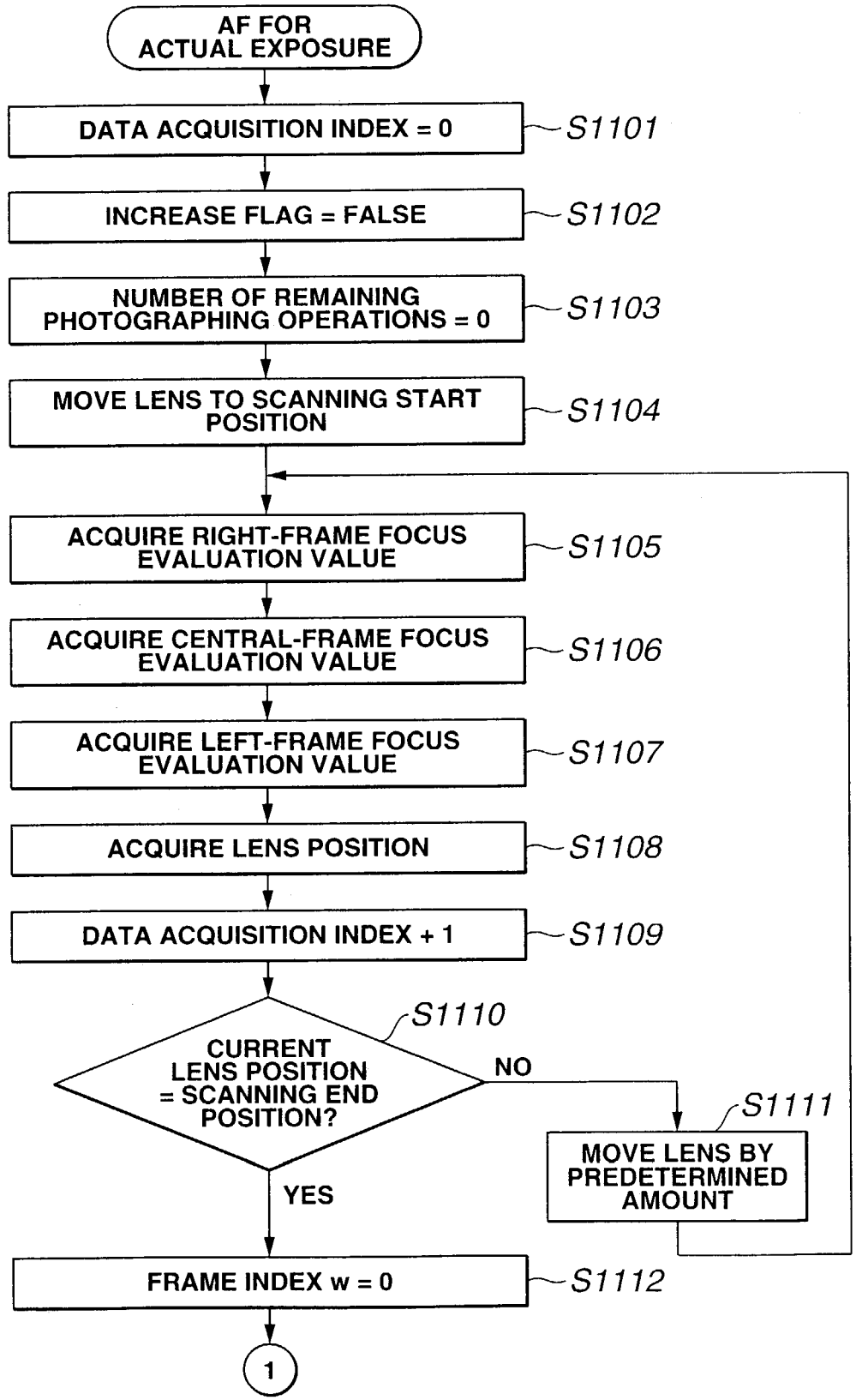
FIGS. 11A and 11B are flowcharts illustrating AF processing for actual exposure shown in FIG. 3, according to a third embodiment of the present invention.
Figure 11B:
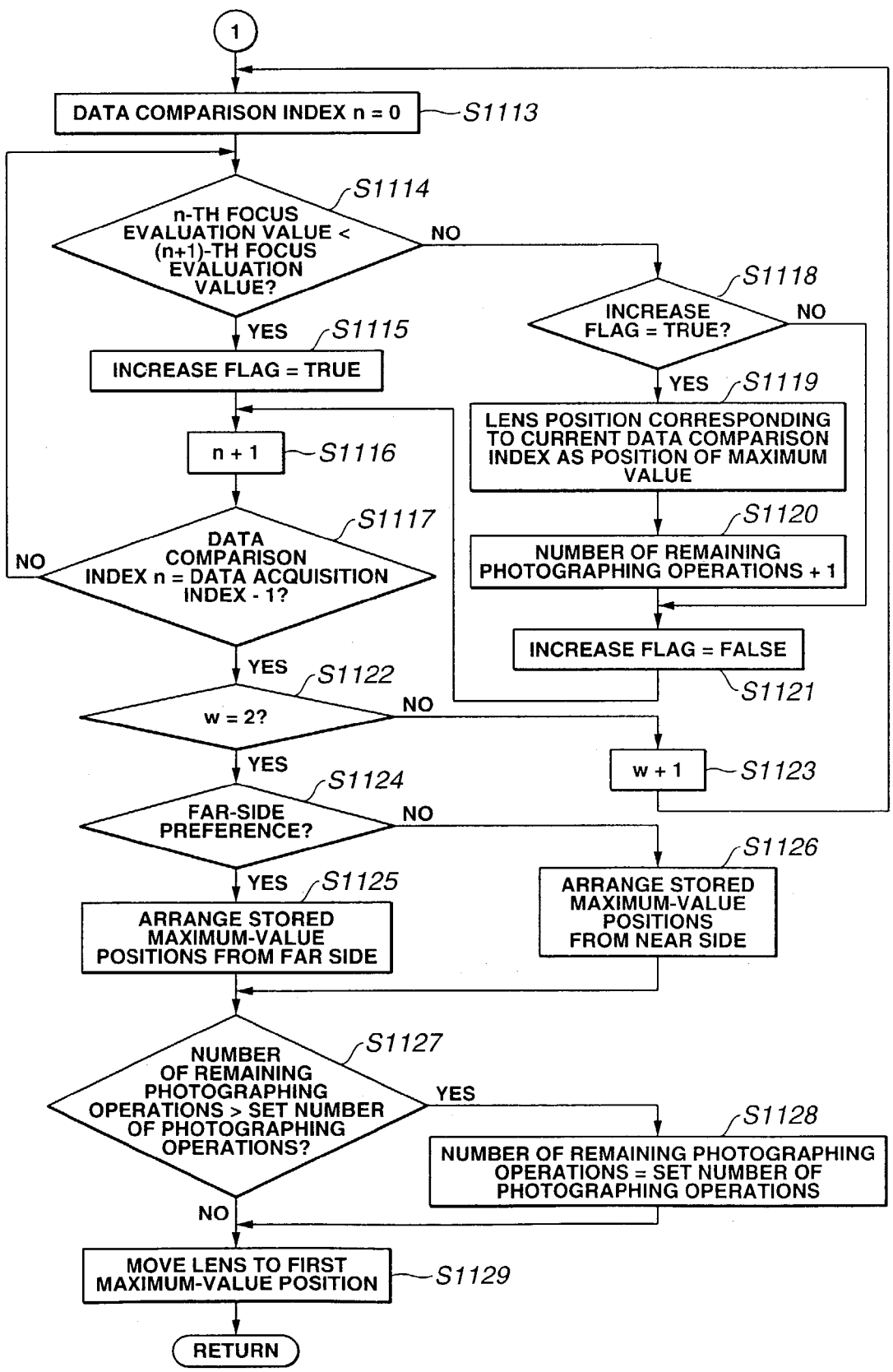

FIGS. 11A and 11B are replaced flowcharts of FIG. 4 describing the AF processing for actual exposure in step S302 shown in FIG. 3.

First, in step S1101, a data acquisition index is set to 0 and is stored in the working memory 126. The data acquisition index is the same as that used in FIG. 4 in the first embodiment.

In step S1102, an increase flag is set to FALSE and is stored in the working memory 126. The increase flag is the same as that used in FIG. 4 in the first embodiment.

In step S1103, the number of remaining photographing operations in actual exposure processing (the same as that used in FIG. 4 in the first embodiment) is set to 0 and is stored in the working memory 126.

In step S1104, the focusing lens 101 is moved to a scanning start position. The scanning start position is, for example, an infinite end of a focusable region.

In step S1105, an analog image signal read from the image pickup device 112 is converted into a digital signal using the A/D converter 113. A high-frequency component of a luminance signal of an output with respect to, a position corresponding to the right frame from among the three range frames from the A/D converter 113 is extracted by the image processor 115, and is stored in the working memory 126 as a right-frame focus evaluation value.

In step S1106, an analog image signal read from the image pickup device 112 is converted into a digital signal using the A/D converter 113. A high-frequency component of a luminance signal of an output with respect to a position corresponding to the central frame from among the three range frames from the A/D converter 113 is extracted by the image processor 115, and is stored in the working memory 126 as a central-frame focus evaluation value.

In step S1107, an analog image signal read from the image pickup device 112 is converted into a digital signal using the A/D converter 113. A high-frequency component of a luminance signal of an output with respect to a position corresponding to the left frame from among the three range frames from the A/D converter 113 is extracted by the image processor 115, and is stored in the working memory 126 as a left-frame focus evaluation value.

In step S1108, the current position of the focusing lens 101 is acquired and is stored in the working memory 126. In step S1109, the data acquisition index is incremented by one, and the resultant value is stored in the working memory 126. In step S1110, it is determined whether or not the current position of the focusing lens 101 equals a scanning end position. If the result of the determination in step S1110 is affirmative, the process proceeds to step S1112. If the result of the determination in step S1110 is negative, the process proceeds to step S1111. The scanning end position is, for example, the nearest end of the focusable region.

In step S1111, the focusing lens 101 is moved in the scanning end direction by a predetermined amount. In step S1112, a frame index w is set to 0, and is stored in the working memory 126. The frame index w is used for identifying a range frame when calculating a maximum value of focus evaluation values (to be described later).

In step S1113, a data comparison index n is set to 0 and is stored in the working memory 126. The data comparison index n is the same as that used in FIG. 4 in the first embodiment.

In step S1114, it is determined whether or not the (n+1)-th focus evaluation value is larger than the n-th focus evaluation value. That is, a certain focus evaluation value is compared with the immediately succeeding focus evaluation value that has been acquired. If the result of the determination in step S1114 is affirmative, the process proceeds to step S1115. If the result of the determination in step S1114 is negative, the process proceeds to step S1118.

In step S1115, the increase flag is set to TRUE. In step S1116, the data comparison index n is incremented by one. In step S1117, it is determined whether or not the data comparison index n equals the data acquisition index −1. If the result of the determination in step S1117 is affirmative, the process proceeds to step S1122. If the result of the determination in step S1117 is negative, the process returns to step S1114.

In step S1118, it is determined whether or not the increase flag is set to TRUE. If the result of the determination in step S1118 is affirmative, the process proceeds to step S1119. If the result of the determination in step S1118 is negative, the process proceeds to step S1121. In step S1119, a lens position corresponding to the current data comparison index n is stored as the position of a maximum value. That is, the position of the focusing lens 101 stored in the working memory 126 at the n-th time is stored in the working memory 126 as the position of a maximum value. In step S1120, the number of remaining photographing operations is incremented by one. In step S1121, the increase flag is set to FALSE, and the process proceeds to step S1116.

In step S1122, it is determined whether or not the frame index w equals 2. If the result of the determination in step S1122 is affirmative, the process proceeds to step S1124. If the result of the determination in step S1122 is negative, the process proceeds to step S1123. In step S1123, the frame index w is incremented by one, and the process proceeds to step S1113. The frame index w and the range-frame position is in one-to-one correspondence. In step S1114, when w=0,
w=1, and w=2, focus evaluation values at the right frame, at the central frame, and at the left frame are compared, respectively.

In step S1124, it is determined whether or not the current photographing mode is set to far-side preference. If the result of the determination in step S1124 is affirmative, the process proceeds to step S1125. If the result of the determination in step S1124 is negative, the process proceeds to step S1126. The current photographing mode is the mode set in step S710 or S711 shown in FIG. 7.

In step S1125, the maximum-value positions stored in the working memory 126 in step S1119 are arranged from a far side. That is, a position closest to infinite from among the maximum-value positions becomes the first position. In step S1126, the maximum-value positions stored in the working memory 126 in step S1119 are arranged from a near side. That is, a position closest to the nearest position from among the maximum-value positions becomes the first position.

In step S1127, it is determined whether or not the number of remaining photographing operations set in step S1120 is larger than the number of photographing operations set in step S707 shown in FIG. 7. If the result of the determination in step S1127 is affirmative, the process proceeds to step S1128. If the result of the determination in step S1127 is negative, the process proceeds to step S1129. In step S1128, the number of photographing operations set in step S707 shown in FIG. 7 is newly set as the number of remaining photographing operations. In step S1129, the focusing lens 101 is moved to a first position of the maximum-value positions arranged in step S1125 or S1126.

Operations in the above-described processing shown in FIGS. 11A and 11B will now be described.

Figure 12:
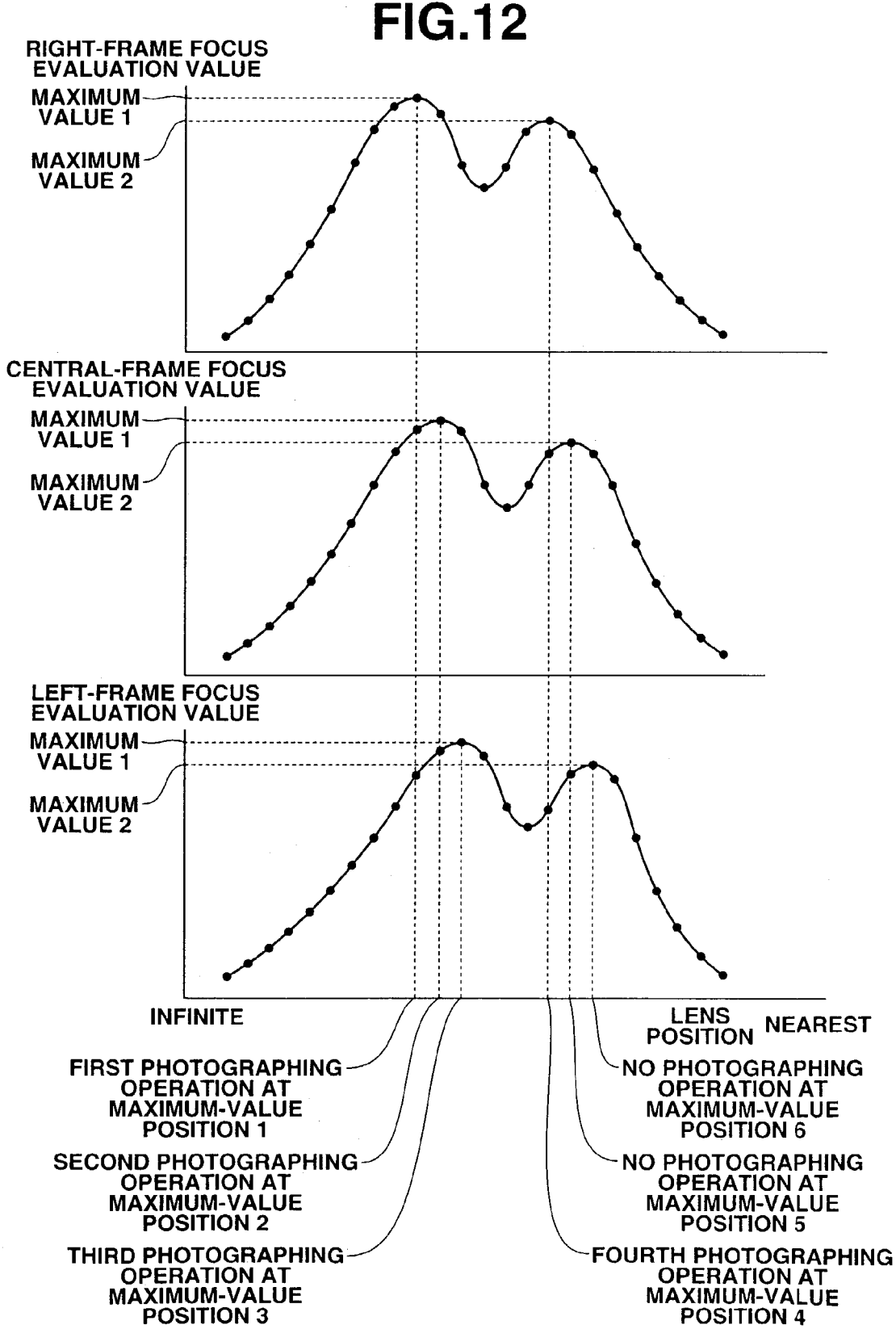
FIG. 12 shows graphs, each illustrating focus evaluation values at respective photographing positions acquired according to the flowchart shown in FIG. 11B.

First, focus evaluation values for each range frame are acquired from step S1105 to step S1111 shown in FIG. 11A. When the relationship between the position of the focusing lens 101 and the acquired focus evaluation value is as shown in FIG. 12, two maximum values are present for each range frame, so that the total number of maximum-value positions of the three range frames is six. These six maximum-value positions are extracted as the maximum-value positions of focus evaluation values of the respective range frames in processing from step S1112 to step S1123 shown in FIG. 11, and are stored as positions from maximum-value position 1 to maximum-value position 6 shown in FIG. 12.

It is assumed that, in the processing shown in FIG. 7 in the second embodiment, the number of photographing operations is set to 4 in step S707 and the photographing mode is set to far-side preference in step S710. In this case, the maximum-value positions are rearranged from the infinite side in step S1125 shown in FIG. 11. That is, the maximum-value positions are arranged in the order from maximum-value position 1 to maximum-value position 6 shown in FIG. 12. In step S1128, the number of remaining photographing operations is set to 4.

Then, actual exposure processing is performed as described with reference to FIG. 5 in the first embodiment. Since the number of photographing operations is 4, four photographing operations are performed from maximum-value position 1 to maximum-value position 4 shown in FIG. 12. No photographing operation is performed at maximum-value position 5 and maximum-value position 6. That is, six maximum-value positions in total are present in the three range frames, and photographing operations are performed at four positions from the infinite side.

According to the above-described processing, even if a plurality of range frames are present and a plurality of maximum values of focus evaluation values are present within each of the range frames, a photographing operation is performed at each of the maximum-value positions. Hence, the photographer can obtain a desired image.

Although in the foregoing description, far-side preference is adopted, near-side preference may also be adopted. In addition, instead of setting the number of photographing operations, photographing operations may be performed at all of the maximum-value positions.

Fourth Embodiment

Although in the foregoing description, when performing a photographing operation at each maximum-value position of focus evaluation values, the photographing operation is sequentially performed from the infinite side or the nearest side, the photographing operation may be sequentially performed in the order of the magnitude of focus evaluation values. A description will now be provided of processing in such an approach. In the following description, as in the third embodiment, the case in which three range frames are provided in the horizontal direction as shown in FIG. 16 will be considered.

Figure 13A:
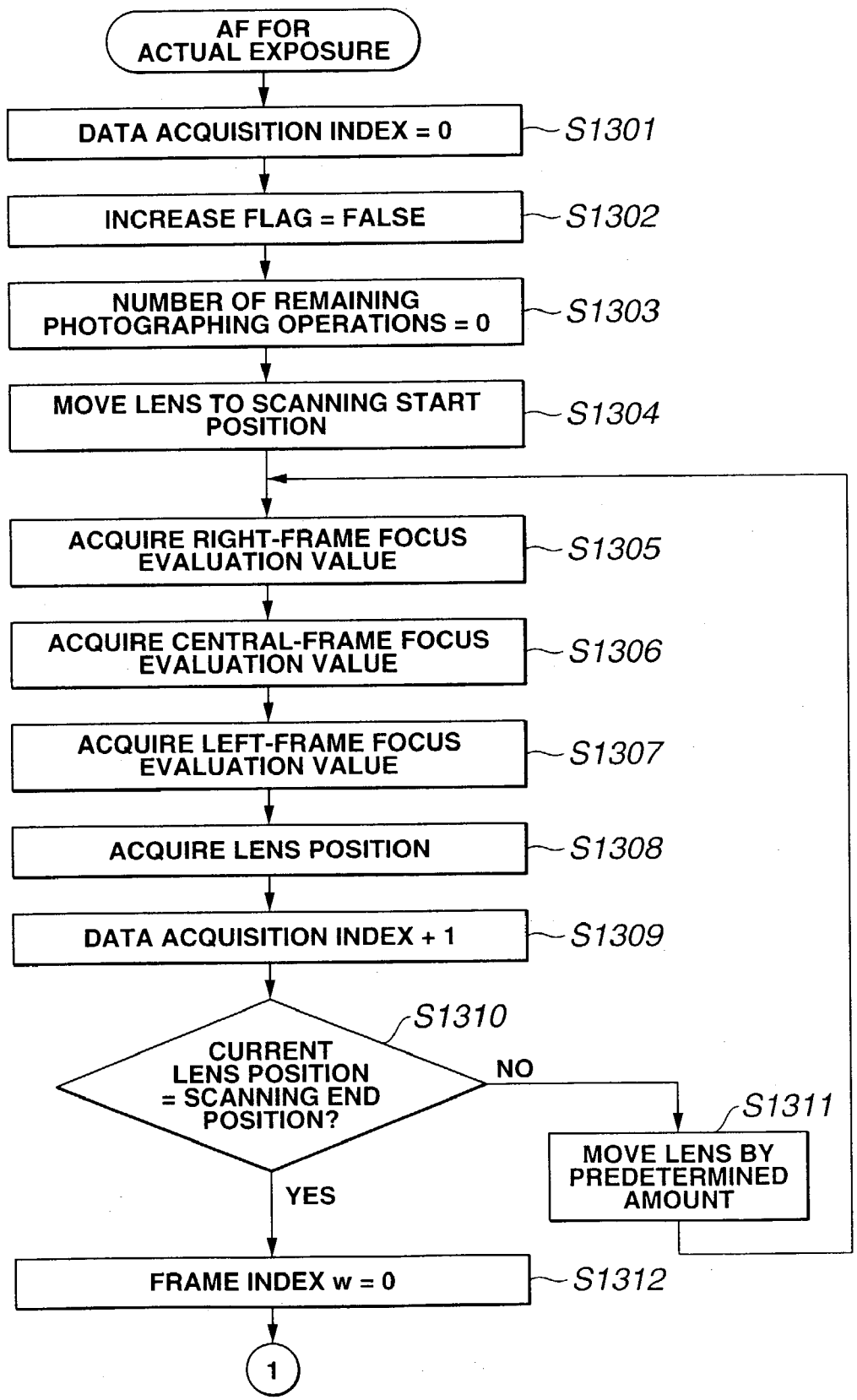
FIGS. 13A and 13B are flowcharts illustrating AF processing for actual exposure shown in FIG. 3, according to a fourth embodiment of the present invention.
Figure 13B:
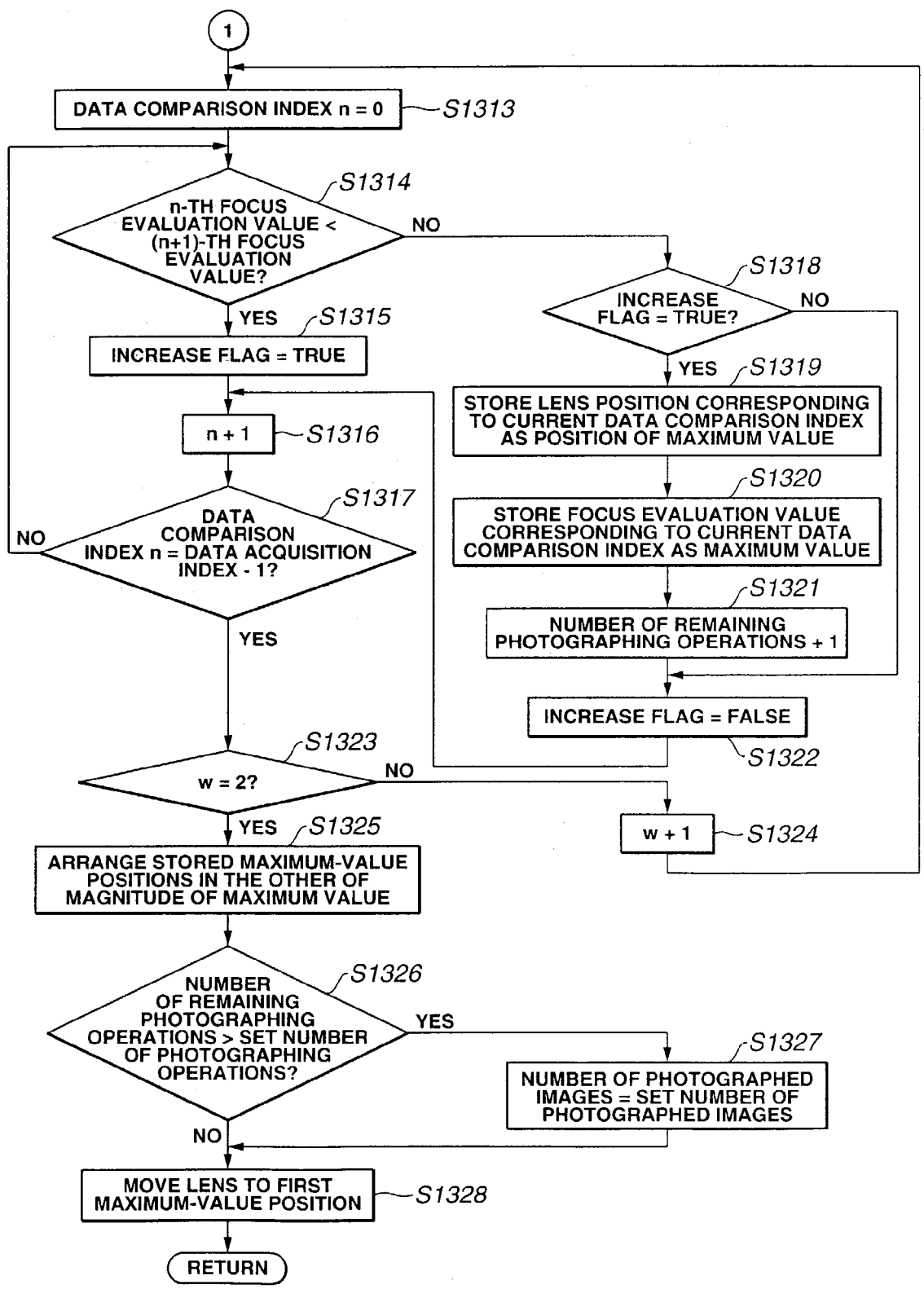

FIGS. 13A and 13B are replaced flowcharts of FIG. 4 describing the AF processing for actual exposure in step S302 shown in FIG. 3.

First, in step S1301, a data acquisition index is set to 0 and is stored in the working memory 126. The data acquisition index is the same as that used in FIG. 4 in the first embodiment.

In step S1302, an increase flag is set to FALSE and is stored in the working memory 126. The increase flag is the same as that used in FIG. 4 in the first embodiment.

In step S1303, the number of remaining photographing operations in actual exposure processing (the same as that used in FIG. 4 in the first embodiment) is set to 0 and is stored in the working memory 126.

In step S1304, the focusing lens 101 is moved to a scanning start position. The scanning start position is, for example, an infinite end of a focusable region.

In step S1305, an analog image signal read from the image pickup device 112 is converted into a digital signal using the A/D converter 113. A high-frequency component of a luminance signal of an output with respect to a position corresponding to the right frame from among the three range frames from the A/D converter 113 is extracted by the image processor 115, and is stored in the working memory 126 as a right-frame focus evaluation value.

In step S1306, an analog image signal read from the image pickup device 112 is converted into a digital signal using the A/D converter 113. A high-frequency component of a luminance signal of an output with respect to a position corresponding to the central frame from among the three range frames from the A/D converter 113 is extracted by the image processor 115, and is stored in the working memory 116 as a central-frame focus evaluation value.

In step S1307, an analog image signal read from the image pickup device 112 is converted into a digital signal using the A/D converter 113. A high-frequency component of a luminance signal of an output with respect to a position corresponding to the left frame from among the three range frames from the A/D converter 113 is extracted by the image processor 115, and is stored in the working memory 126 as a left-frame focus evaluation value.

In step S1308, the current position of the focusing lens 101 is acquired and is stored in the working memory 126.

In step S1309, the data acquisition index is incremented by one, and the resultant value is stored in the working memory 126.

In step S1310, it is determined whether or not the current position of the focusing lens 101 equals a scanning end position. If the result of the determination in step S1310 is affirmative, the process proceeds to step S1312. If the result of the determination in step S1310 is negative, the process proceeds to step S1311. The scanning end position is, for example, the nearest end of the focusable region.

In step S1311, the focusing lens 101 is moved in the scanning end direction by a predetermined amount. In step S1312, a frame index w is set to 0, and is stored in the working memory 126. The frame index w is the same as that used with reference to FIGS. 11A and 11B in the third embodiment.

In step S1313, a data comparison index n is set to 0 and is stored in the working memory 126. The data comparison index n is the same as that used in FIG. 4 in the first embodiment.

In step S11314, it is determined whether or not the (n+1)-th focus evaluation value is larger than the n-th focus evaluation value. That is, a certain focus evaluation value is compared with the immediately succeeding focus evaluation value that has been acquired. If the result of the determination in step S1314 is affirmative, the process proceeds to step S1315. If the result of the determination in step S1314 is negative, the process proceeds to step S1318. In step S1315, the increase flag is set to TRUE. In step S1316, the data comparison index n is incremented by one. In step S1317, it is determined whether or not the data comparison index n equals the data acquisition index −1. If the result of the determination in step S1317 is affirmative, the process proceeds to step S1323. If the result of the determination in step S1317 is negative, the process returns to step S1314.

In step S1318, it is determined whether or not the increase flag is set to TRUE. If the result of the determination in step S1318 is affirmative, the process proceeds to step S1319. If the result of the determination in step S1318 is negative, the process proceeds to step S1322.

In step S1319, a lens position corresponding to the current data comparison index n is stored as the position of a maximum value. That is, the position of the focusing lens 101 stored in the working memory 126 at the n-th time is stored in the working memory 126 as the position of a maximum value.

In step S1320, the focus evaluation value corresponding to the current data comparison index n is stored in the working memory 126 as a maximum value. In step S1321, the number of remaining photographing operations is incremented by one. In step S1322, the increase flag is set to FALSE, and the process proceeds to step S1316.

In step S1323, it is determined whether or not the frame index w equals 2. If the result of the determination in step S1323 is affirmative, the process proceeds to step S1325. If the result of the determination in step S1323 is negative, the process proceeds to step S1324. In step S1324, the frame index w is incremented by one, and the process proceeds to step S1313. The relationship between the frame index w and the range-frame position is the same as that described in the third embodiment.

In step S1325, the maximum-value positions corresponding to data comparison indices stored in step S1319 are rearranged in the order of the magnitude of the maximum values stored in step S1320. At that time, a position where the largest value of the maximum values stored in step S1320 is acquired is the first maximum-value position.

In step S1326, it is determined whether or not the number of remaining photographing operations set in step S1321 is larger than the number of photographing operations set in step S707 shown in FIG. 7. If the result of the determination in step S1326 is affirmative, the process proceeds to step S1327. If the result of the determination in step S1326 is negative, the process proceeds to step S1328.

In step S1327, the number of photographing operations set in step S707 shown in FIG. 7 is newly set as the number of remaining photographing operations. In step S1328, the focusing lens 101 is moved to the first position of the maximum-value positions arranged in step S1325.

Operations in the above-described processing shown in FIGS. 13A and 13B will now be described.

Figure 14:
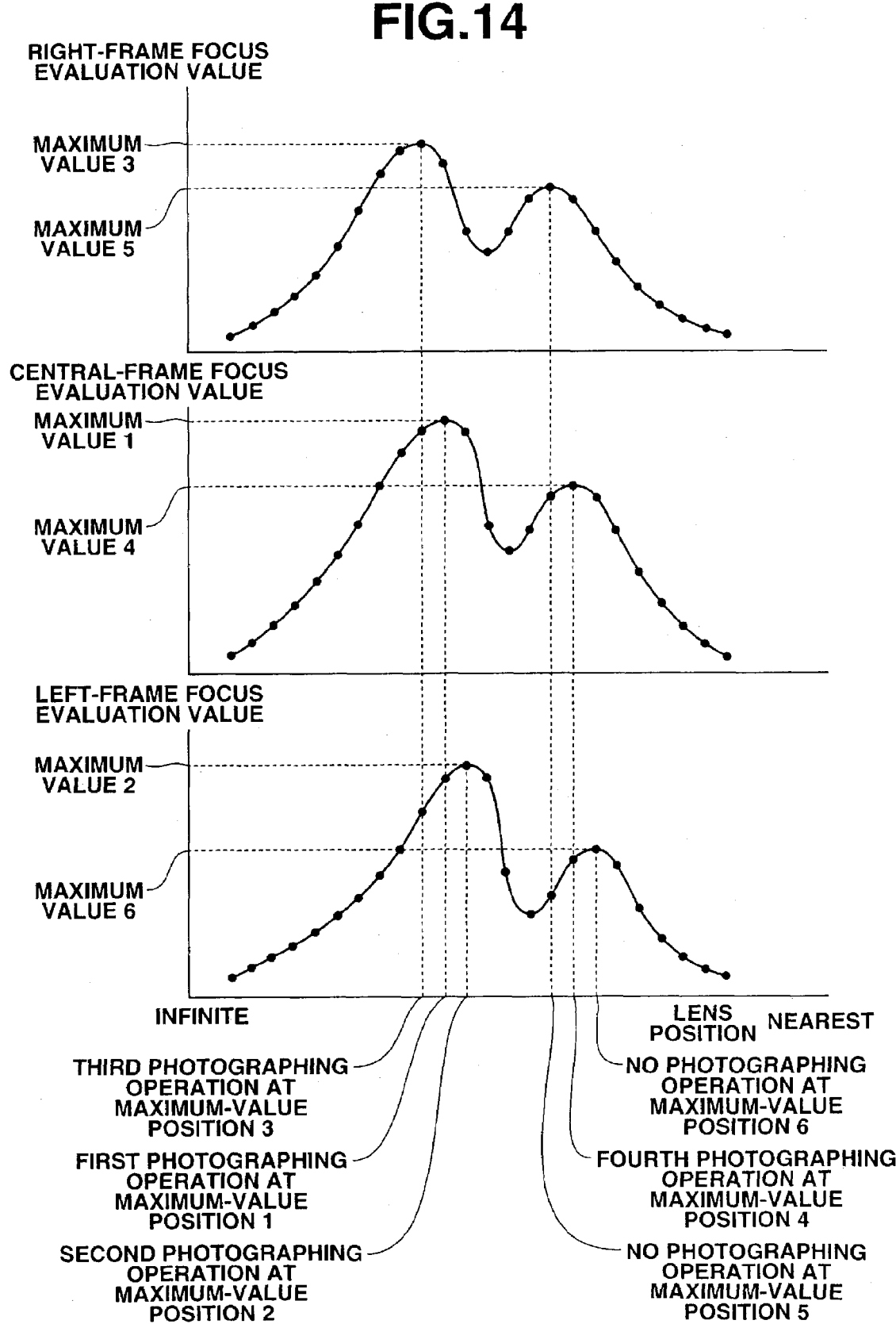
FIG. 14 shows graphs, each illustrating focus evaluation values at respective photographing positions acquired according to the flowcharts shown in FIGS. 13A and 13B.
Figure 15:
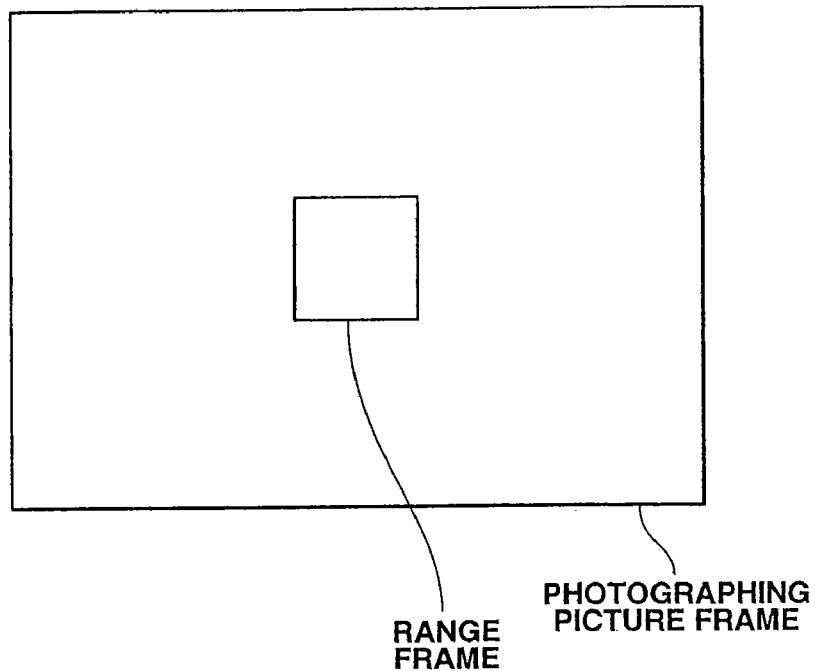
FIG. 15 is a diagram illustrating a range frame in a photographing picture frame.

It is assumed that the results of acquisition of focus evaluation values for each frame in the processing from step S1304 to step S1311 shown in FIG. 13A are as shown in FIG. 14, in which six maximum values are present, and that the order of magnitude of these maximum values is maximum value 1>maximum value 2>maximum value 3>maximum value 4>maximum value 5>maximum value 6. In this case, in step S1325 shown in FIG. 13B, corresponding maximum-value positions are rearranged in the order of magnitude of focus evaluation values. As a result, as shown in FIG. 14, maximum-value positions from maximum-value position 1 to maximum-value position 6 are rearranged, and photographing operations are performed in the order of smaller numbers.

It is assumed that, in the processing shown in FIG. 7 in the second embodiment, the number of photographing operations is set to 4 in step S707. First, a first photographing operation is performed at a first maximum-value position, i.e., at maximum-value position 1 corresponding to maximum value 1 of focus evaluation values acquired in the central frame. Next, a second photographing operation is performed at a second maximum-value position, i.e., at maximum-value position 2 corresponding to maximum value 2 of focus evaluation values acquired in the left frame. Thereafter, photographing operations are sequentially performed up to maximum-value position 4. Since the set number of photographing operations is 4, no photographing operation is performed at maximum-value position 5 and maximum-value position 6.

As described above, since photographing operations are sequentially performed from a position corresponding to the largest value from among maximum values of focus evaluation values, it is possible to easily obtain a high-contrast image in which the camera is focused on an object intended by the photographer as a main object.

Although in the foregoing description, the number of photographing operations is set, the number of photographing operations may be the same as the number of maximum-value positions.

As described above, according to the first through fourth embodiments, when a plurality of maximum values of focus evaluation values are present, a photographing operation is performed at each focus lens position where a maximum value is present. Hence, it is possible to easily obtain an image in which an object desired by the photographer to be focused is focused.

Since the number of photographing operations can be set, an unnecessarily large number of photographing operations are not performed.

When a plurality of range frames are present, a photographing operation is performed at each position where a maximum value of focus evaluation values is present within a range frame. As a result, it is possible to easily obtain an image in which an object desired by the photographer to be focused is focused.

Since photographing operations are sequentially performed from a position where the maximum value of focus evaluation values is largest, it is possible to easily obtain a high-contrast image in which an object desired by the photographer to be focused is focused.

Other Embodiments

The object of the present invention may, of course, be achieved by supplying a system or an apparatus with a storage medium (or a recording medium) storing program codes of software for realizing the functions of the above-described embodiments, and reading and executing the program codes stored in the storage medium by means of a computer (or a CPU or an MPU (microprocessor unit)) of the system or the apparatus. In such a case, the program codes themselves read from the storage medium realize the functions of the above-described embodiments, so that the storage medium storing the program codes constitutes the present invention. The present invention may, of course, also be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by the processing.

The present invention may, of course, be applied to a case in which, after writing program codes read from a storage medium into a memory provided in a function expanding card inserted into a computer or in a function expanding unit connected to the computer, a CPU or the like provided in the function expanding card or the function expanding unit performs a part or the entirety of actual processing, and the functions of the above-described embodiments are realized by the processing.

When applying the present invention to the above-described storage medium, program codes corresponding to the above-described flowcharts are stored in the storage medium.

The present invention may also be realized by combining the above-described embodiments or technical elements of the embodiments whenever necessary.

The present invention may be applied to a case in which a part or the entirety of the following claims or the above-described embodiments constitutes an apparatus, a combination of apparatuses, or a component constituting an apparatus.

The present invention may be applied to each type of camera, such as an electronic camera for photographing a still image or a moving image using an image pickup device, a camera using a silver-halide film, a single reflex camera, a lens shutter camera, a monitor camera or the like, an image pickup apparatus other than a camera, an optical apparatus, or the like, an apparatus applied to such a camera, image pickup apparatus, optical apparatus or the like, or a component constituting such an apparatus.

As described above, according to the foregoing embodiments, even if at least two objects are present at different distances, it is possible to obtain an image in which a position intended by the photographer is focused.

The individual components designated by blocks in the drawings are all well known in the image pickup apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup apparatus comprising:
a setting unit configured to set a number of times photographing operations are to be performed, the number being selected by a user;
a focus adjusting unit configured to:
automatically identify each of a plurality of objects at different distances from the image pickup apparatus in at least one detection field of view;
automatically determine positions to which a photographing optical system is to be driven to focus on the plurality of identified objects; and
automatically drive the photographing optical system by the number of times set by said setting unit so that in each photographing operation the photographing optical system is driven to one of the automatically determined positions to focus on a different one of the plurality of identified objects; and
a control unit configured to control the image pickup apparatus to perform photographing operations performed by an image pickup sensor at each determined position of the photographing optical system driven by said focus adjusting unit so as to be focused on a different one of the plurality of identified objects in each photographing operation,
wherein said setting unit sets the number before said focus adjusting unit drives the photographing optical system.

2. An image pickup apparatus according to claim 1, further comprising:
said image pickup sensor for taking an image of an object in the detection field of view,
wherein said focus adjusting unit determines that the plurality of objects are present at the different distances in the detection field of view based on maximum values of a high-frequency component in an output signal from said image pickup sensor.

3. An image pickup apparatus according to claim 2, wherein, when a number of positions to each of which the photographing optical system is driven so as to be focused on each of the plurality of objects is greater than the selected number, said photographing unit limits a number of photographing operations.

4. An image pickup apparatus according to claim 3, wherein said photographing unit performs photographing operations at the positions to each of which the photographing optical system is driven so as to be focused on each of the plurality of objects, in a sequence from a position focused at a far-distance side to a position focused at a near-distance side.

5. An image pickup apparatus according to claim 3, wherein said photographing unit performs photographing operations at the positions to each of which the photographing optical system is driven so as to be focused on each of the plurality of objects, in a sequence from a position focused at a near-distance side to a position at a far-distance side.

6. An image pickup method comprising the steps of:
setting a number of times photographing operations are to be performed, the number being selected by a user;
automatically identifying each of a plurality of objects at different distances from the image pickup apparatus in at least one detection field of view;
automatically determining positions to which a photographing optical system is to be driven to focus on the plurality of identified objects; and
automatically driving the photographing optical system by the number of times set in said setting step so that in each photographing operation the photographing optical system is driven to one of the automatically determined positions to focus on a different one of the plurality of identified objects; and
performing photographing operations by an image pickup sensor at each determined position of the photographing optical system driven so as to be focused on a different one of the plurality of identified objects in each photographing operation,
wherein said setting step sets the number before said driving step drives the photographing optical system.

7. An image pickup method according to claim 6, further comprising the step of determining that the plurality of objects are present at the different distances in the detection field of view based on maximum values of a high-frequency component in an output signal from the image pickup sensor.

8. An image pickup method according to claim 7, wherein, when a number of positions to each of which the photographing optical system is driven so as to be focused on each of the plurality of objects is greater than the selected number, a number of photographing operations is limited.

9. An image pickup method according to claim 8, wherein photographing operations are performed at the positions to each of which the photographing optical system is driven so as to be focused on each of the plurality of objects, in a sequence from a position focused at a far-distance side to a position focused at a near-distance side.

10. An image pickup method according to claim 8, wherein photographing operations are performed at the positions to each of which the photographing optical system is driven so as to be focused on each of the plurality of objects, in a sequence from a position focused at a near-distance side to a position focused at a far-distance side.

11. An image-pickup control computer program, embodied on a computer-readable medium, representing a method comprising the steps of:
setting a number of times photographing operations are to be performed, the number being selected by a user;
automatically identifying each of a plurality of objects at different distances from the image pickup apparatus in at least one detection field of view;
automatically determining positions to which a photographing optical system is to be driven to focus on the plurality of identified objects; and
automatically driving the photographing optical system by the number of times set in said setting step so that in each photographing operation the photographing optical system is driven to one of the automatically determined positions to focus on a different one of the plurality of identified objects; and
performing photographing operations by an image pickup sensor at each determined position of the photographing optical system driven so as to be focused on a different one of the plurality of identified objects in each photographing operation,
wherein said setting step sets the number before said driving step drives the photographing optical system.

12. An image-pickup control computer program according to claim 11, said method further comprising the step of determining that the plurality of objects are present at the different distances in the detection field of view based on maximum values of a high-frequency component in an output signal from the image pickup sensor.

13. An image-pickup control computer program according to claim 12, wherein, when a number of positions to each of which the photographing optical system is driven so as to be focused on each of the plurality of objects is greater than the selected number, a number of photographing operations is limited.

14. An image-pickup control computer program according to claim 13, wherein photographing operations are performed at the positions to each of which the photographing optical system is driven so as to be focused on each of the plurality of objects, in a sequence from a position focused at a far-distance side to a position focused at a near-distance side.

15. An image-pickup control computer program according to claim 13, wherein photographing operations are performed at the positions to each of which the photographing optical system is driven so as to be focused on each of the plurality of objects, in a sequence from a position focused at a near-distance side to a position focused at a far-distance side.

16. A storage medium storing an image-pickup control computer program according to claim 11.

* * * * *

UNITED STATES PATENT AND TRADEMARK OFFICE
CERTIFICATE OF CORRECTION

PATENT NO.        : 7,391,461 B2                                      Page 1 of 1
APPLICATION NO.   : 10/372972
DATED             : June 24, 2008
INVENTOR(S)       : Hiroyuki Ogino It is certified that error appears in the above-identified patent and that said Letters Patent is hereby corrected as shown below:

Col. 2,   line 33, "each the" should read --each of the--.

Col. 4,   line 30, "EVF128" should read --EVF 128--.

Col. 6,   line 44, "1126" should read --126--.

Col. 14,  line 20, "step S11314," should read --step S1314,--.

Col. 18,  line 3, "and" should be deleted.

line 39, "image-pickup" should read --image pickup--.

line 49, "and" should be deleted".

line 64, "image-pickup" should read --image pickup--.

Col. 19,  line 3, "image-pickup" should read --image pickup--.

line 9, "image-pickup" should read --image pickup--.

Col. 20,  line 3, "image-pickup" should read --image pickup--.

line 9, "image-pickup" should read --image pickup--.

Signed and Sealed this

Third Day of February, 2009

JOHN DOLL
*Acting Director of the United States Patent and Trademark Office*